United States Patent
Watanabe et al.

(10) Patent No.: US 8,403,233 B2
(45) Date of Patent: Mar. 26, 2013

(54) SEMICONDUCTOR INTEGRATED CIRCUIT DEVICE AND IC CARD MOUNTING SAME

(75) Inventors: Kazuki Watanabe, Hino (JP); Akihiro Toriyama, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 0 days.

(21) Appl. No.: 13/260,303

(22) PCT Filed: Mar. 31, 2010

(86) PCT No.: PCT/JP2010/055834
§ 371 (c)(1),
(2), (4) Date: Sep. 24, 2011

(87) PCT Pub. No.: WO2010/119772
PCT Pub. Date: Oct. 21, 2010

(65) Prior Publication Data
US 2012/0006905 A1    Jan. 12, 2012

(30) Foreign Application Priority Data
Apr. 15, 2009  (JP) ................................ 2009-098745

(51) Int. Cl.
*G06K 19/06* (2006.01)
(52) U.S. Cl. ........................ 235/492; 235/487
(58) Field of Classification Search .................. 235/487, 235/492
See application file for complete search history.

(56) References Cited

U.S. PATENT DOCUMENTS 6,031,419 A    2/2000  Roberts et al.
6,437,609 B1 * 8/2002  Chehadi ........................ 327/102
6,970,690 B2 * 11/2005  Yajima et al. .............. 455/343.1
(Continued)

FOREIGN PATENT DOCUMENTS

JP         3177502 B2    4/2001
JP      2005-222265 A    8/2005
(Continued)

OTHER PUBLICATIONS

D. Baddeley, "Final Committee Draft ISO/IEC 14443-2", Identification cards—Contactless integrated circuit(s) card—Proximity card—Part 2: Radio frequency power and signal interface, http://www.waaza.org/download/fcd-14443-2.pdf (searched on May 30, 2008).

(Continued)

*Primary Examiner* — Daniel Hess
*Assistant Examiner* — Paultep Savusdiphol
(74) *Attorney, Agent, or Firm* — Miles and Stockbridge P.C.

(57) ABSTRACT

In an IC card, even when undershoot or overshoot which occurs upon an amplitude change by communication data is large, the change is accurately detected. A semiconductor device has antenna terminals, a power supply circuit for generating power supply voltage from an AC signal supplied to the antenna terminals, and a receiver circuit for demodulating an information signal superimposed on the AC signal. The receiver circuit includes a rectifier circuit, a filter circuit, a capacitor, an amplifier, a feedback path, a switch circuit, a binarizing circuit, and a control circuit. An output of the amplifier is transmitted to an inverting input terminal thereof, and the switch circuit is controlled by an output of the control circuit. In a predetermined period since level changes of an output of the binarizing circuit, the switch circuit is controlled to an off state by the output of the control circuit.

20 Claims, 7 Drawing Sheets

U.S. PATENT DOCUMENTS

| | | | |
|---|---|---|---|
| 2005/0117411 A1* | 6/2005 | Koshikawa et al. | 365/189.09 |
| 2005/0173542 A1 | 8/2005 | Watanabe et al. | |
| 2006/0119332 A1* | 6/2006 | Elbanhawy | 323/273 |
| 2006/0119970 A1 | 6/2006 | Hayashi et al. | |
| 2006/0202043 A1 | 9/2006 | Watanabe et al. | |
| 2009/0009104 A1* | 1/2009 | Doi et al. | 315/291 |

FOREIGN PATENT DOCUMENTS

| | | |
|---|---|---|
| JP | 2006-164312 A | 6/2006 |
| JP | 2008-236617 A | 10/2008 |
| JP | 2008-251813 A | 10/2008 |

OTHER PUBLICATIONS

D. Baddeley, "Final Committee Draft ISO/IEC 14443-3", Identification cards—Contactless integrated circuit(s) card—Proximity card—Part 3: Initialization and anticollision, http://www.waaza.org/download/fcd-14443-3.pdf (searched on May 30, 2008).

International Standard ISO/IEC 18092, "Information technology—Telecommunication and information exchange between systems—Near Field Communication—Interface and Protocol (NFCIP-1)", http://stadards.iso.org/ittf/licence.html (searched on May 30, 2008).

* cited by examiner

SEMICONDUCTOR INTEGRATED CIRCUIT DEVICE AND IC CARD MOUNTING SAME

TECHNICAL FIELD

The present invention relates to a semiconductor integrated circuit device and an IC card mounting the same and, more particularly, to a technique effectively used to detect an amplitude change by communication data also in the case where an undershoot or overshoot which occurs at the time of an amplitude change in communication data of a contactless IC card (hereinbelow, called IC card) is large.

BACKGROUND ART

A so-called IC card in which a semiconductor integrated circuit device and an antenna are mounted exchanges information to/from a reader/writer device and a semiconductor integrated circuit device and realizes various functions such as transmission of data held in the IC card and retention of data transmitted from the reader/writer device.

According to the international standard ISO/IEC14443, an IC card having a contactless interface is called a PICC, and performs RF communication with a reader/writer device called a PCD. ISO stands for International Organization for Standardization, IEC stands for International Electrical Commission, PICC stands for Proximity Card, and PCD stands for Proximity Coupling Device.

For example, as described in the following non-patent literature 1, in type A of the international standard ISO/IEC14443, communication from a PCD to a PICC employs a coding method which is a modified miller coding in a modulation system with the degree of modulation of ASK 100%. However, in type B of the international standard ISO/IEC14443, communication from a PCD to a PICC employs the coding method which is an NRZ-L coding in a modulation system with a modulation ratio of ASK 10%. NRZ-L stands for Non Return to Zero-Level. ASK stands for Amplitude Shift Keying as one of digital modulation methods.

As described in the following non-patent literature 2, in initialization of the type B, a PICC of the type B waits for a request command of the type B in an idle state. The request command is for preparation to generate an application family identifier (AFI), an attribute information parameter (PARAM), and a cyclic redundancy check code (CRC) in a PICC of the type B. When the PICC of the type B detects a match of the AFI, a response to the request of the type B is transmitted to the PCD. The response includes a pseudo unique identifier (PUPI), application information (application data), protocol information, and a cyclic redundancy check code (CRC). After that, when the PICC of the type B receives a PICC selection command, it transmits a response to the command to the PCD and shifts to an active state. Further, transmission data of the type B is called a character as a frame, and the border of frames is determined by SOF (Start Of Frame) and EOF (End Of Frame). Each of the SOF and EOF includes one trailing edge and the logic "0" having a predetermined length.

In recent years, a communication technique called a near field communication technique (NFC) which simplifies and enlarges transactions in home appliances, digital media, wireless communication connection for consumers, contents, and business is being widely spread. The NFC technique is compatible with various existing communication systems and realizes a near field communication of the maximum baud rate of 847 Kbps in about 10 cm by using an radio frequency of 13.56 MHz. Particularly, the NFC technique is used for a cellular phone terminal having therein an IC card microcomputer (secure chip) having an electronic payment function. It aims to improve end-user convenience by utilizing the technique for various contactless electronic settlements such as payment for an item purchased in a shop by a contactless settlement and payment for transportation at a station. NFC stands for Near Field Communication.

The following non-patent literature 3 describes the NFC of the international standard ISO/IEC18092. In communication of a transfer rate of 212 Kbps to 424 Kbps of the NFC of the ISO/IEC 18092, the Manchester coding is used in ASK modulation whose modulation percentage is 8% to 30%. In a passive communication mode, an initiator generates an RF electric field for supplying energy to a target. On the other hand, in an active communication mode, the initiator and the target alternately generate the RF electric field.

In initialization of communication at a transfer rate of 106, 212, or 424 Kbps of ISO/IEC 18092, an application switches to the active communication mode and selects one of the three transfer rates. In initialization in a passive communication mode of the transfer rate of 212 or 424 Kbps, a preamble is inserted before a data packet. The preamble includes the minimum 48 bits in which the logic "0" is encoded.

As described above, in so-called downlink communication which is data communication from a reader/writer device conformed with the type B of the international standard ISO/IEC 14443 to an IC card, as described in the non-patent literatures 1 and 2, a so-called amplitude modulating method of changing the amplitude of a carrier signal is used.

The downlink communication conformed with the type B of the international standard ISO/IEC 14443 described in the non-patent literature 1 is information transmission according to the so-called amplitude modulation method of partly modulating the amplitude of a carrier signal which is a high-frequency AC signal by downlink communication data, and the downlink communication data is coded by NRZ-L.

The SOF (communication start signal) is added to the head of downlink communication data conformed with the type B of the international standard ISO/IEC 14443 described in the non-patent literature 1, and the EOF (communication end signal) is added to the end of the downlink communication data.

Further, the downlink communication conformed with the type B of the international standard ISO/IEC 14443 described in the non-patent literature 2 is information transmission according to the so-called amplitude modulation method of partly modulating the amplitude of a carrier signal which is a high-frequency AC signal by transmission data.

Downlink communication data conformed with the international standard ISO/IEC 18092 described in the non-patent literature 3 is coded by a Manchester code, and a preamble is added at the head of downlink communication data.

As described above, a semiconductor integrated circuit device mounted on an IC card receives a high frequency signal supplied from a reader/writer device by an antenna mounted on a contactless IC card, rectifies and smoothes voltage generated across both ends of the antenna, and generates an internal voltage necessary for the operation of an internal circuit.

The power received by the antenna mounted on the IC card changes according to the communication distance to the reader/writer device and, on the other hand, the signal amplitude modulated by the downlink communication data which is transmitted from the reader/writer device changes. Generally, when the communication distance is short, the modulation signal amplitude received by the IC card is large. With distance from the communication distance, the modulation signal amplitude decreases.

Therefore, to increase the communication distance of the IC card, a receiver circuit capable of performing demodulation even in the case where an amplitude change formed by downlink communication data is small has to be realized.

As a receiver circuit mounted on an IC card adapted to a communication interface using an amplitude modulation method as downlink communication conformed with the type B of the international standard ISO/IEC 14443 described in the non-patent literatures 1 and 2, a receiver circuit disclosed in the patent literature 1 can be used.

The receiver circuit disclosed in the patent literature 1 rectifies an AC signal at both ends of an antenna mounted on an IC card and eliminates an unnecessary frequency component by a filter circuit. An output signal of the filter circuit is supplied to an inverting input terminal (−) of an operational amplifier via a capacitor. By detecting a change point in an output signal of the filter circuit by the operational amplifier and a feedback path, a signal amplitude is amplified, and downlink communication data transmitted from a reader/writer device can be received.

A receiver circuit disclosed in the patent literature 2 rectifies an AC signal at both ends of an antenna mounted on an IC card and eliminates an unnecessary frequency component by a filter circuit. From a signal obtained by eliminating the unnecessary frequency component, two signals of a low-frequency signal and a high-frequency signal are generated. From the two signals, change points in positive and negative directions are detected by a comparator having a hysteresis characteristic. By binarizing the change points by a bistable circuit, data is demodulated.

LITERATURE OF BACKGROUND ARTS

Patent Literature

Patent Literature 1: Japanese Unexamined Patent Publication No. 2005-222265
Patent Literature 2: Japanese Patent Publication No. 3,177,502

Non-Patent Literature

Non-Patent Literature 1
D. Baddeley, "Final Committee Draft ISO/IEC 14443-2", Identification cards—Contactless integrated circuit(s) card—Proximity card—Part 2: Radio frequency power and signal interface, http://www.waaza.org/download/fcd-14443-2.pdf (searched on May 30, 2008)
Non-Patent Literature 2
D. Baddeley, "Final Committee Draft ISO/IEC 14443-3", Identification cards—Contactless integrated circuit(s) card—Proximity card—Part 3: Radio Itialization and anti-collision, http://www.waaza.org/download/fcd-14443-3.pdf (searched on May 30, 2008)
Non-Patent Literature 3
International Standard ISO/IEC 18092, "Information technology—Telecommunication and information exchange between systems—Near Field Communication—Interface and Protocol (NFCIP-1)", http://stadards.iso.org/ittf/licence.html (searched on May 30, 2008)

DISCLOSURE OF THE INVENTION

Problems that the Invention is to Solve

As described in the non-patent literatures 1 and 2, in an IC card system using the amplitude modulation method for data transmission (downlink communication) from a reader/writer device to an IC card, an amplitude change in downlink communication data received by the IC card at the time of near field communication is large, and an amplitude change in downlink communication data received by the IC card at the time of long distance communication is small. Therefore, to increase the communication distance of an IC card, reception sensitivity of a receiver circuit mounted on the IC card has to be increased.

On the other hand, in a modulation signal forming downlink communication data output from a reader/writer device, there is the possibility that an undershoot or overshoot occurs at the time of an amplitude change. The phenomenon is described also in the non-patent literatures 1 and 2, and an undershoot or overshoot up to 10% of a modulation signal amplitude is permitted.

Under conditions as described above, in the case of increasing the reception sensitivity of a receiver circuit mounted on an IC card in order to enlarge the communication distance of the IC card or the like, an undershoot or overshoot becomes extremely small at the time of long distance communication. Consequently, stable demodulation can be performed. On the contrary, however, in near field communication, the amplitude change by downlink communication data becomes large and, on the other hand, an undershoot or overshoot which occurs at the time of an amplitude change also becomes large. As a result, although an amplitude change formed by downlink communication data can be detected, an amplitude change caused by the undershoot or overshoot is also detected. The receiver circuit cannot demodulate data normally and there is the possibility that erroneous reception occurs. The above was clarified by examinations made by inventors herein prior to the present invention.

As described in the non-patent literatures 1 and 2, related art examples of a receiver circuit mounted on an IC card adapted to a communication interface using the amplitude modulation method as downlink communication means are the receiver circuits disclosed in the patent literatures 1 and 2.

The examinations made by the inventors herein prior to the present invention will be described below on the basis of the patent literature 1.

The receiver circuit described in the patent literature 1 rectifies and smoothes an AC signal at both ends of an antenna mounted on an IC card and eliminates an unnecessary frequency component by a filter circuit. An output signal of the filter circuit is supplied via a capacitor to an inverting input terminal (−) of an operational amplifier. The operational amplifier and a feedback path detect a change point in the output signal of the filter circuit, and a signal amplitude is amplified.

The operational amplifier and the feedback path have the following two states; a state 1 and a state 2 at the time of receiving data. By repeating transition between the two states, the data amplitude is amplified.

State 1: In a state where the potential of the inverting input terminal (−) of the operational amplifier is higher than that of a non-inverting input terminal (+), decrease in the data amplitude (that is, decrease in the potential of the inverting input terminal (−)) can be detected, but increase in the data amplitude (that is, increase in the potential of the inverting input terminal (−)) cannot be detected.

State 2: In a state where the potential of the inverting input terminal (−) of the operational amplifier is lower than that of the non-inverting input terminal (+), increase in the data amplitude (that is, increase in the potential of the inverting input terminal (−)) can be detected, but decrease in the data amplitude (that is, decrease in the potential of the inverting input terminal (−)) cannot be detected.

With respect to the case where a modulation signal forming downlink communication data which is output from a reader/writer device has a large undershoot or overshoot at the time of an amplitude change, the operation of the receiver circuit described in the patent document 1 is examined.

In the state of no modulation, the receiver circuit is in the state 1. When amplitude modulation of a carrier signal starts in association with start of transmission of downlink communication data in the reader/writer device, decrease in the amplitude of the carrier signal is detected, and the receiver circuit shifts to the state 2.

However, the modulated carrier signal has a large undershoot, after the amplitude of the carrier signal decreases once, the amplitude returns to be large. At this time, although the amplitude of the carrier signal is smaller than that in the state of no modulation, large return of the amplitude of the carrier signal is detected, and the receiver circuit shifts to the state 1.

After that, the amplitude of the carrier signal increases according to the downlink communication data output from the reader/writer device, and is returned to the same signal amplitude as that in the no modulation state. Accordingly, a signal change in the positive direction is supplied to the receiver circuit. However, the receiver circuit is in the state 1, so that the change cannot be detected, and the state 1 is maintained.

However, the amplitude change in the carrier signal has a large overshoot, after the amplitude of the carrier signal becomes too large once, the amplitude largely returns to an amplitude equivalent to that in the state of no modulation. Consequently, the signal amplitude in the negative direction is supplied to the receiver circuit, so that the receiver circuit shifts to the state 2.

Subsequently, the above-described operation is repeated in association with the amplitude changes in the carrier signals. A signal detected by the receiver circuit and output from the receiver circuit is largely different from the downlink communication data which is transmitted from the reader/writer device, and cannot be normally demodulated.

The following was clarified by examinations preliminarily made by the inventors herein. In the case where a modulation signal of downlink communication data transmitted from the reader/writer device has a large undershoot or overshoot at the time of an amplitude change as described above, it is difficult to stably demodulate the downlink communication data transmitted from the reader/writer device by detecting not only the amplitude change by the downlink communication data but also the amplitude change caused by the undershoot or overshoot by the receiver circuit.

For example, in the downlink communication described in the non-patent literature 1, an SOF signal (communication start signal) added to the head of the downlink communication data is an extremely important signal indicative of the head of data, and the time width and the like has to be accurately recognized. However, by detecting the amplitude change caused by the undershoot or overshoot as described above, the SOF (communication start signal) cannot be recognized normally, and communication with the reader/writer device becomes impossible.

The present invention has been achieved by the examinations of the inventors herein prior to the present invention as described above.

Therefore, an object of the present invention is to provide a receiver circuit capable of stably demodulating an amplitude-modulated signal supplied from a reader/writer device by accurately detecting an amplitude change by downlink communication data even in the case where an undershoot or an overshoot which occurs at the time of an amplitude change by downlink communication data is large in an IC card.

The above and other objects and novel features of the present invention will become apparent from the description of the specification and the attached drawings.

Means for Solving the Problems

Outline of representative ones of inventions disclosed in the present application will be described as follows.

A semiconductor integrated circuit device (B2) as a representative embodiment of the present invention has antenna terminals (LA and LB) coupled to an antenna (L1), a power supply circuit (B3) for generating power supply voltage from an alternating-current (AC) signal supplied from the antenna to the antenna terminals, and a receiver circuit (B5) for demodulating an information signal which is superimposed on the AC signal (refer to FIG. 1).

The receiver circuit (B5) includes a rectifier circuit (B9), a filter circuit (B10), a capacitor (C1), an amplifier (A1), a feedback path (B11), a switch circuit (SW1), a binarizing circuit (B12), and a control circuit (B13) (refer to FIG. 3).

The rectifier circuit (B9) rectifies and smoothes the AC signal supplied to the antenna terminals.

An output signal of the rectifier circuit (B9) is supplied to an input terminal of the filter circuit (B10) which reduces a high-frequency component.

An output signal (S1) of the filter circuit (B10) is supplied to an inverting input terminal (−) of the amplifier (A1) via the capacitor (C1).

The amplifier (A1) has a function of inverting and amplifying an input signal (S2) supplied to the inverting input terminal (−) with respect to a first reference voltage (V1).

An output signal (S3) of the amplifier (A1) can be transmitted to the inverting input terminal (−) via the feedback path (B11) and the switch circuit (SW1).

The switch circuit (SW1) can be controlled by an output signal (SC1) of the control circuit (B13).

The binarizing circuit (B12) binarizes the output signal (S3) of the amplifier (A1).

In a lapse period of predetermined time (T1) since a level change (X, Y) in an output signal (SR) of the binarizing circuit (B12), the switch circuit (SW1) is controlled to an off state (disable) by the output signal (SC1) of the control circuit (B13) (refer to FIG. 4).

Effects of the Invention

An effect obtained by representative one of the inventions disclosed in the present application will be briefly described as follows.

In an IC card, even in the case where an undershoot or an overshoot which occurs at the time of an amplitude change by downlink communication data is large, the amplitude change by the downlink communication data can be accurately detected.

BEST MODE FOR CARRYING OUT THE INVENTION

1. Summary Outline of the Embodiments

Figure 1:
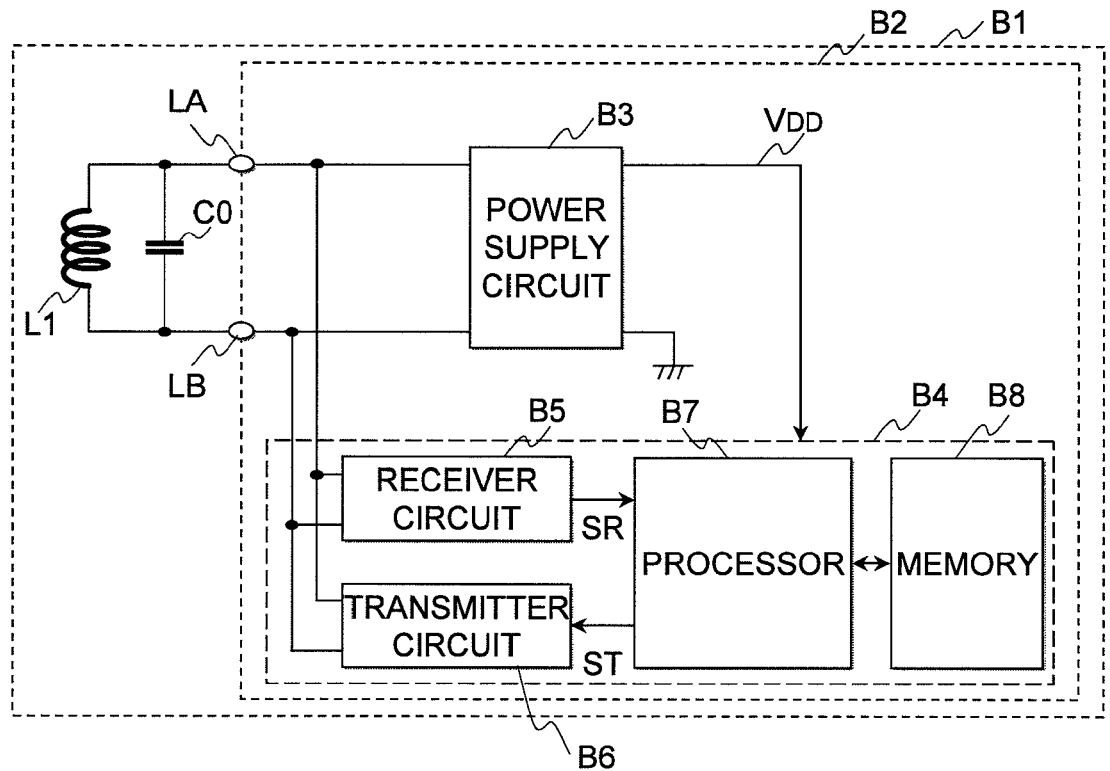
FIG. 1 is a diagram showing a basic configuration of a semiconductor integrated circuit device and a contactless IC card according to a first embodiment of the present invention.

First, outline of representative embodiments of the invention disclosed in the present application will be described. Reference numerals in drawings referred to in parentheses in the description of the outline of the representative embodiments just illustrate the concept of components to which the reference numerals are designated.

A semiconductor integrated circuit device (B2) as a representative embodiment of the present invention has antenna terminals (LA and LB) coupled to an antenna (L1), a power supply circuit (B3) for generating power supply voltage from an alternating-current (AC) signal supplied from the antenna to the antenna terminals, and a receiver circuit (B5) for demodulating an information signal which is superimposed on the AC signal (refer to FIG. 1).

Figure 3:
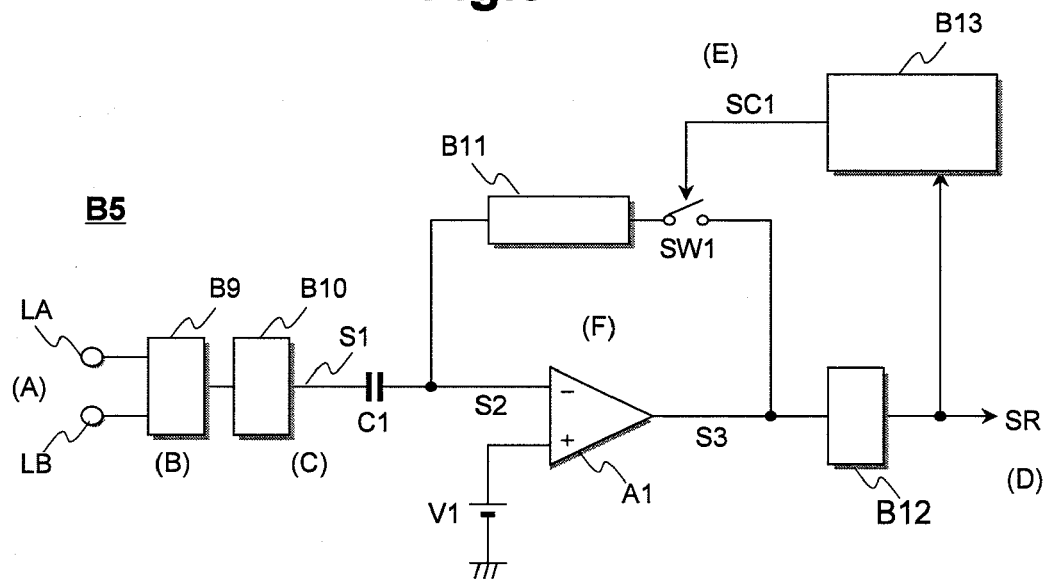
FIG. 3 is a diagram showing the configuration of a receiver circuit B5 provided in an internal circuit B4 of a semiconductor integrated circuit device B2 mounted on the IC card B1 illustrated in FIG. 1.

The receiver circuit (B5) includes a rectifier circuit (B9), a filter circuit (B10), a capacitor (C1), an amplifier (A1), a feedback path (B11), a switch circuit (SW1), a binarizing circuit (B12), and a control circuit (B13) (refer to FIG. 3).

The rectifier circuit (B9) rectifies and smoothes the AC signal supplied to the antenna terminal.

An output signal of the rectifier circuit (B9) is supplied to an input terminal of the filter circuit (B10) which reduces a high frequency component.

An output signal (S1) of the filter circuit (B10) is supplied to an inverting input terminal (−) of the amplifier (A1) via the capacitor (C1).

The amplifier (A1) has a function of inverting and amplifying an input signal (S2) supplied to the inverting input terminal (−) with respect to a first reference voltage (V1).

An output signal (S3) of the amplifier (A1) can be transmitted to the inverting input terminal (−) via the feedback path (B11) and the switch circuit (SW1).

The switch circuit (SW1) can be controlled by an output signal (SC1) of the control circuit (B13).

The binarizing circuit (B12) binarizes the output signal (S3) of the amplifier (A1).

Figure 4:
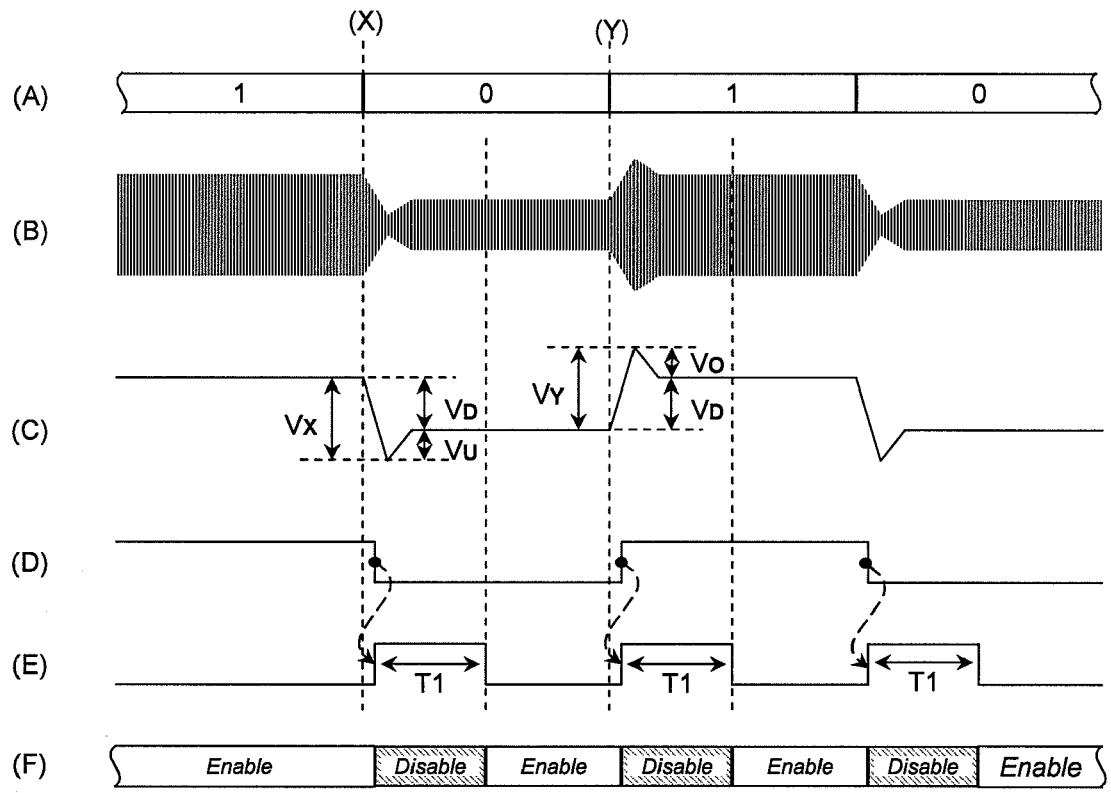
FIG. 4 is a diagram showing operation waveforms of units in the receiver circuit B5 provided in the internal circuit B4 of the semiconductor integrated circuit device B2 mounted on the IC card B1 and illustrated in FIG. 3.

In a lapse period of predetermined time (T1) since a level change (X, Y) in an output signal (SR) of the binarizing circuit (B12), the switch circuit (SW1) is controlled to an off state (disable) by the output signal (SC1) of the control circuit (B13) (refer to FIG. 4).

In the embodiment, even in the case where an undershoot or an overshoot of the AC signal supplied to the antenna terminal is large, the amplitude change can be accurately detected.

In a preferred embodiment, by controlling the switch circuit (SW1) to the off state (disable) in a lapse period of the predetermined time (T1), the feedback path (B11) is electrically separated from at least any of the inverting input terminal (−) of the amplifier (A1) and an output terminal for generating the output signal (S3).

In another preferred embodiment, the feed path (B11) includes two diode elements (D1, D2; M1, M2) which are coupled in opposite directions (refer to FIGS. 5, 7, 11, and 12).

Figure 9:
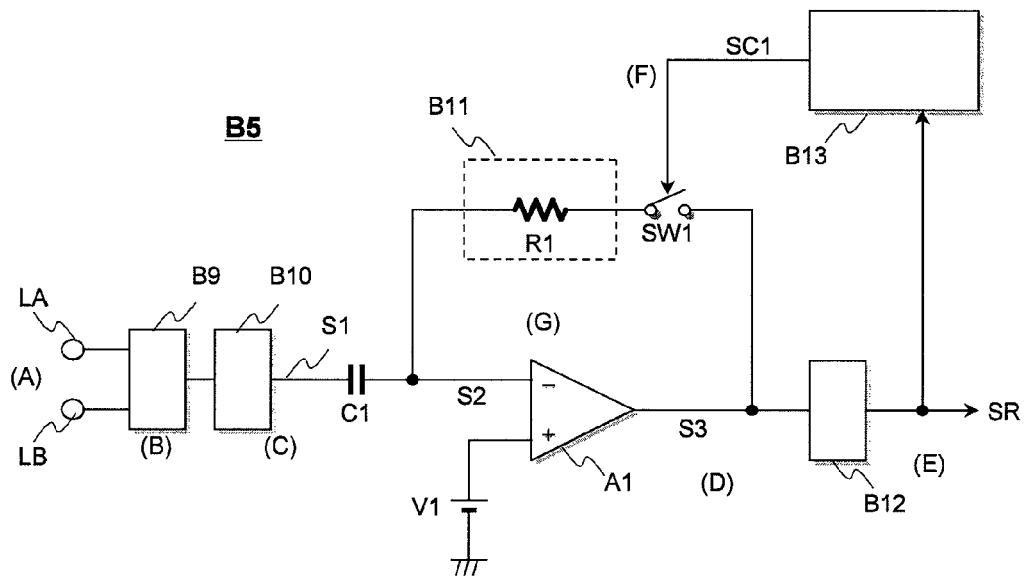
FIG. 9 is a diagram showing the configuration of the receiver circuit B5 according to a fourth embodiment of the present invention, which is provided in the internal circuit B4 of the semiconductor integrated circuit device B2 mounted on the IC card B1 illustrated in FIG. 1.

In further another preferred embodiment, the semiconductor integrated circuit device further includes a voltage drop element (R1) for generating a voltage drop between the inverting input terminal (−) of the amplifier (A1) and the output terminal for generating the output signal (S3) (refer to FIG. 9).

Figure 11:
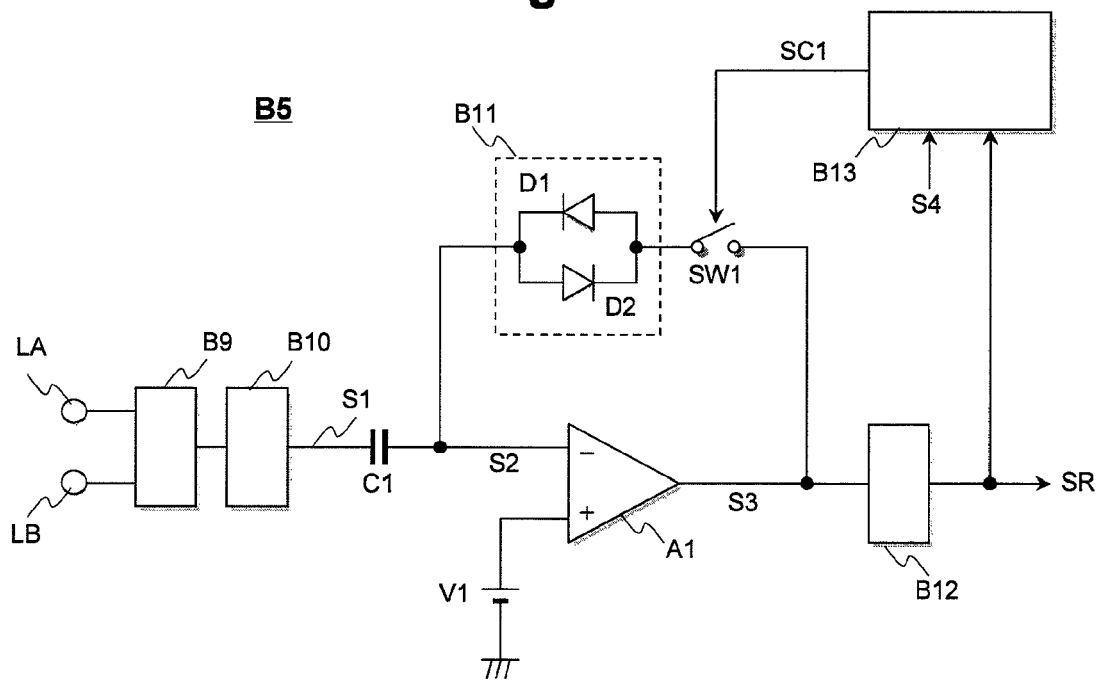
FIG. 11 is a diagram showing the configuration of the receiver circuit B5 according to the third embodiment of the present invention, which is provided in the internal circuit B4 of the semiconductor integrated circuit device B2 mounted on the IC card B1 illustrated in FIG. 1.

In a more preferred embodiment, a control signal (S4) can be supplied to the control circuit (B13), and the lapse period of the predetermined time (T1, T2) can be variably set by the control signal (S4) (refer to FIG. 11).

Figure 12:
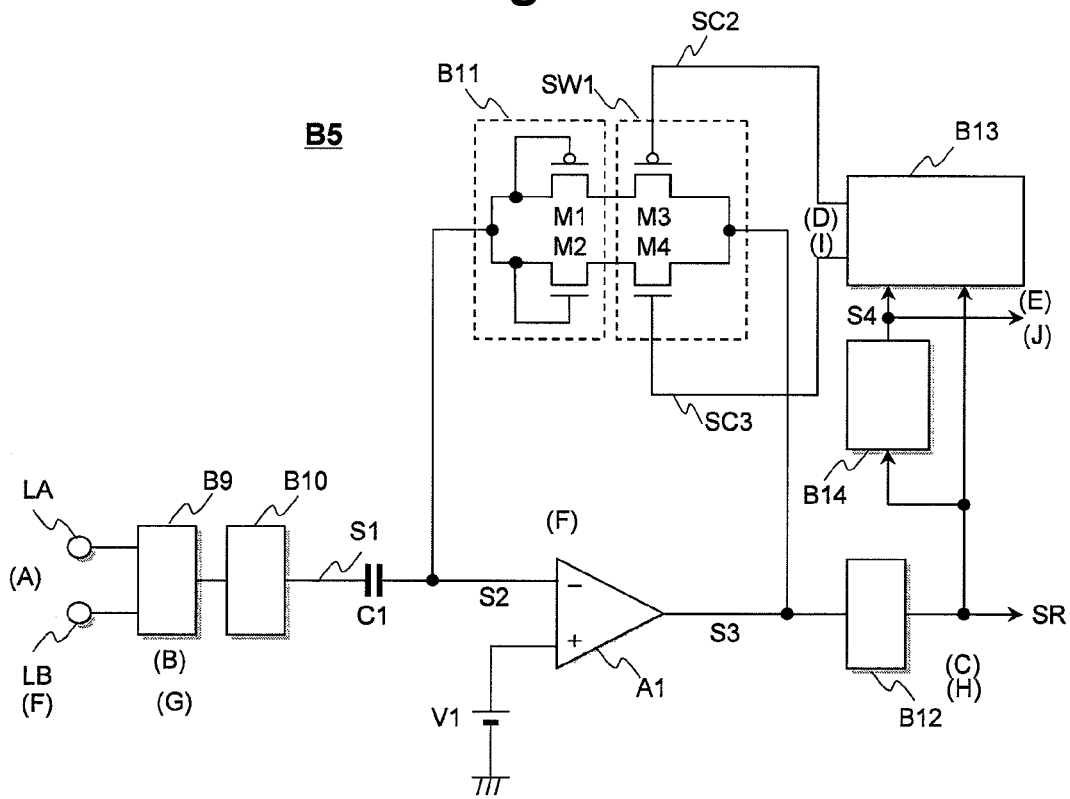
FIG. 12 is a diagram showing the configuration of the receiver circuit B5 according to a sixth embodiment of the present invention, which is provided in the internal circuit B4 of the semiconductor integrated circuit device B2 mounted on the IC card B1 illustrated in FIG. 1.

In a further more preferred embodiment, the receiver circuit (B5) of the semiconductor integrated circuit device (B2) further includes a determining circuit (B14) (refer to FIG. 12).

The determining circuit (B14) determines communication speed of the information signal superimposed on the AC signal from the output signal (SR) of the binarizing circuit (B12).

Figure 13:
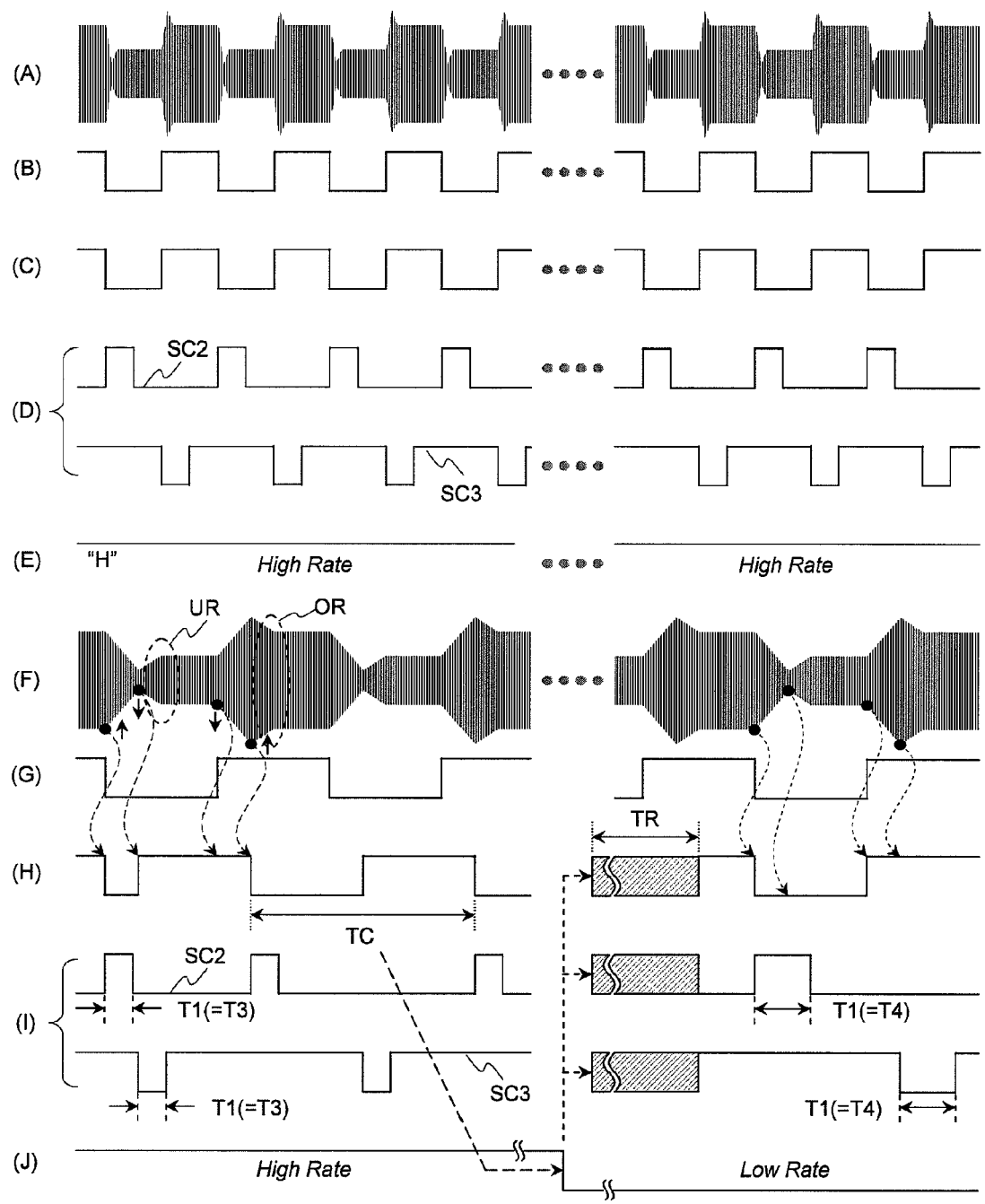
FIG. 13 is a diagram showing operation waveforms of units in the receiver circuit B5 provided in the internal circuit B4 of the semiconductor integrated circuit device B2 mounted on the IC card B1 and illustrated in FIG. 12.

The control signal (S4) as a result of determination of the determining circuit (B14) is supplied from the determining circuit (B14) to the control circuit (B13), and in response to the control signal (S4), the lapse period of the predetermined time (T1, T2) can be variably set (refer to FIG. 13).

Figure 5:
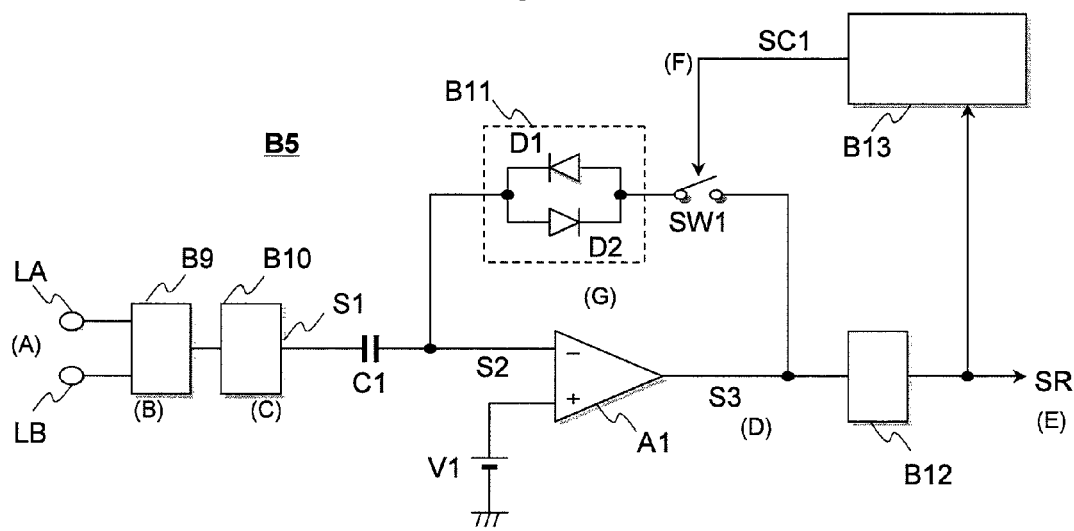
FIG. 5 is a diagram showing the configuration of the receiver circuit B5 according to a second embodiment of the present invention, which is provided in the internal circuit B4 of the semiconductor integrated circuit device B2 mounted on the IC card B1 illustrated in FIG. 1.

In a concrete embodiment, the diode element of the feedback path (B11) is configured by a diode (D1, D2) of p-n junction (refer to FIGS. 5 and 11).

Figure 7:
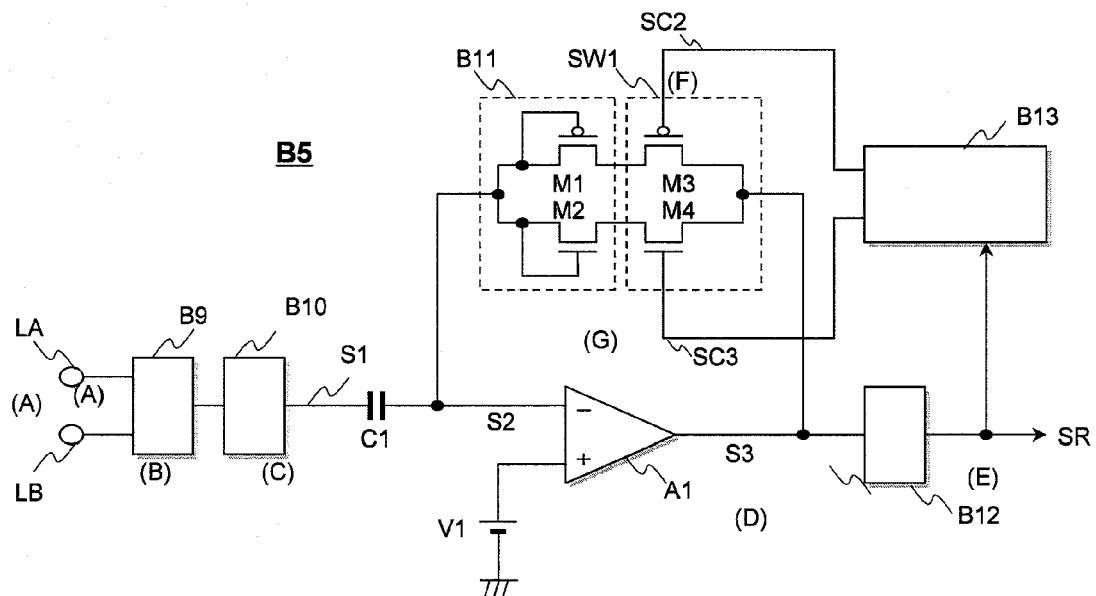
FIG. 7 is a diagram showing the configuration of the receiver circuit B5 according to a third embodiment of the present invention, which is provided in the internal circuit B4 of the semiconductor integrated circuit device B2 mounted on the IC card B1 illustrated in FIG. 1.

In another concrete embodiment, the diode element of the feedback path (B11) is configured by a P-channel MOS transistor (M1) and an N-channel MOS transistor (M2) (refer to FIGS. 7 and 12).

In a different concrete embodiment, the voltage drop element of the feedback path (B11) is configured by a resistor (R1) (refer to FIG. 9).

In a most concrete embodiment, the amplifier is an operational amplifier (A1), and the first reference voltage (V1) is supplied to a non-inverting input terminal (+) of the operational amplifier (A1) (refer to FIGS. 3, 5, 7, 9, 11, and 12).

Figure 2:
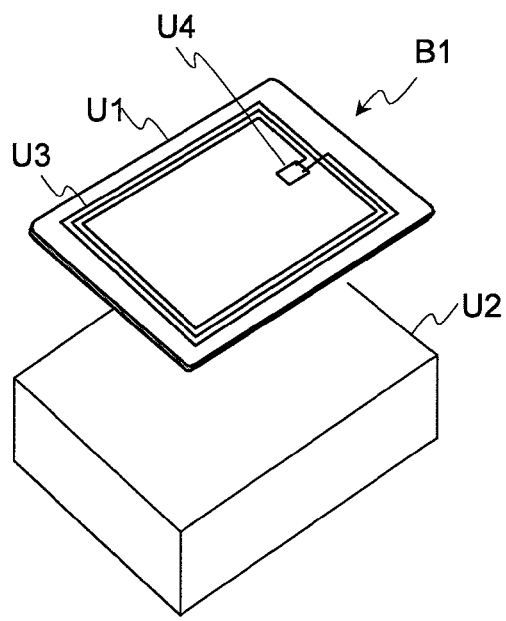
FIG. 2 is a diagram showing the structure of an IC card B1 illustrated in FIG. 1.

[2] An IC card (B1) according to a representative embodiment as another aspect of the present invention is obtained by mounting a semiconductor integrated circuit device (U4, B2) and an antenna (U3) formed by a wire on a main surface of a substrate (U1) (refer to FIG. 2).

The semiconductor integrated circuit device (B2) has:

an antenna terminal (LA, LB) coupled to the antenna (U3, L1);

a power supply circuit (B3) for generating power supply voltage from an alternating-current (AC) signal supplied from the antenna to the antenna terminal; and a receiver circuit (B5) for demodulating an information signal which is superimposed on the AC signal (refer to FIG. 1).

The receiver circuit (B5) includes a rectifier circuit (B9), a filter circuit (B10), a capacitor (C1), an amplifier (A1), a feedback path (B11), a switch circuit (SW1), a binarizing circuit (B12), and a control circuit (B13) (refer to FIG. 3).

The rectifier circuit (B9) rectifies the AC signal supplied to the antenna terminal to smooth the AC signal.

An output signal of the rectifier circuit (B9) is supplied to an input terminal of the filter circuit (B10) which reduces a high frequency component.

An output signal (S1) of the filter circuit (B10) is supplied to an inverting input terminal (−) of the amplifier (A1) via the capacitor (C1).

The amplifier (A1) has a function of inverting and amplifying an input signal supplied (S2) to the inverting input terminal (−) with respect to a first reference voltage (V1).

An output signal (S3) of the amplifier (A1) can be transmitted to the inverting input terminal (−) via the feedback path (B11) and the switch circuit (SW1).

The switch circuit (SW1) can be controlled by an output signal (SC1) of the control circuit (B13).

The binarizing circuit (B12) binarizes the output signal (S3) of the amplifier (A1).

In a lapse period of predetermined time (T1) since a change in level (X, Y) of an output signal (SR) of the binarizing circuit (B12), the switch circuit (SW1) is controlled to an off state (disable) by the output signal (SC1) of the control circuit (B13) (refer to FIG. 4).

In the embodiment, even in the case where an undershoot or an overshoot of the AC signal supplied to the antenna terminal is large, an amplitude change can be accurately detected.

2. Further Detailed Description of the Embodiments

Next, the embodiments will be described more specifically. In all of the drawings for explaining the best modes for carrying out the invention, the same reference numeral is designated to a part having the same function as that in the above-described drawings, and its description will not be repeated.

Semiconductor integrated circuit devices and IC cards according to the present invention will be described below with reference to the attached drawings.

First Embodiment

Semiconductor Integrated Circuit Device and Contactless IC Card of First Embodiment FIG. 1 is a diagram showing a basic configuration of a semiconductor integrated circuit device and a contactless IC card according to a first embodiment of the invention.

As shown in FIG. 1, a contactless IC card B1 includes an antenna L1, a capacitor C0, and a semiconductor integrated circuit device B2. The semiconductor integrated circuit device B2 has a power supply circuit B3, an internal circuit B4, and antenna terminals LA and LB for coupling the antenna L1.

FIG. 2 is a diagram showing the structure of the IC card B1 illustrated in FIG. 1.

As shown in FIG. 2, the IC card B1 has a form of a card by a printed wiring board U1 which is resin-molded. The antenna L1 shown in FIG. 1 which receives electromagnetic waves from a reader/writer device U2 on the outside is configured by a coil U3 having a spiral shape formed by a metal wire on the main surface of the printed wiring board U1. The semiconductor integrated circuit device B2 is configured by a single IC chip U4 and mounted on the printed wiring board U1. The coil U3 as the antenna L1 is electrically coupled to the IC chip U4.

The present invention is applied to a contactless IC card which does not typically have, on the surface of the IC card, input/output terminals from/to the outside. Obviously, the invention can be applied to a dual-type IC card having a contactless interface and input/output contact terminals. Although not limited, the semiconductor integrated circuit device B2 of FIG. 1 is formed on a single semiconductor substrate made of single-crystal silicon or the like by a known technique of manufacturing a semiconductor integrated circuit device.

The antenna L1 which received electromagnetic waves from the reader/writer device U2 outputs a high-frequency AC signal to the antenna terminals LA and LB. At the time of communication from the IC card B1 to the reader/writer device U2, the AC signal of the antenna terminals LA and LB is modulated by a transmission information signal (data).

In FIG. 1, the power supply circuit B3 is configured by a rectifier circuit and a smoothing capacitor. The rectifier circuit rectifies and smoothes an AC signal received by the antenna L1 mounted on the IC card to obtain an output power supply voltage $V_{DD}$. A voltage regulator may be provided in the power supply circuit B3 so that the output power supply voltage $V_{DD}$ does not become equal to or larger than predetermined voltage.

The power supply voltage $V_{DD}$ output from the power supply circuit B3 is supplied as the operation power supply voltage of the internal circuit B4. The internal circuit B4 is configured by a receiver circuit B5, a transmitter circuit B6, a signal processor B7, and a memory B8. The receiver circuit B5 demodulates an information signal superimposed on the AC signal received by the antenna L1 provided in the IC card and supplies the resultant signal as a digital reception information signal SR to the signal processor B7. The transmitter circuit B6 receives a digital transmission information signal ST output from the signal processor B7, and modulates the AC signal received by the antenna L1 with the transmission information signal ST. In response to a change according to the modulation in reflection of the electromagnetic waves from the antenna L1, the reader/writer device U2 receives a transmission information signal from the signal processor B7.

<<Configuration of Receiver Circuit of First Embodiment>>

FIG. 3 is a diagram showing the configuration of the receiver circuit B5 provided in the internal circuit B4 of the semiconductor integrated circuit device B2 mounted on the IC card B1 illustrated in FIG. 1.

As shown in FIG. 3, the receiver circuit B5 includes a rectifier circuit B9, a filter circuit B10, a capacitor C1, an operational amplifier A1, a feedback path B11, a switch circuit SW1, a binarizing circuit B12, and a control circuit B13. The rectifier circuit B9 rectifies and smoothes a high-frequency signal generated between the antenna terminals LA and LB. An unnecessary frequency component is eliminated by the filter circuit B10, and an output signal S1 is generated from the filter circuit B10. The output signal S1 is supplied as an input signal S2 via the capacitor C1 to an inverting input terminal (−) of the operational amplifier A1. A reference voltage V1 is supplied to a non-inverting input terminal (+) of the operational amplifier A1. The feedback path B11 and the switch circuit SW1 are coupled in series between the output terminal of the operational amplifier A1 and the inverting input terminal (−).

Although the rectifier circuit B9 is disposed in the receiver circuit B5, the rectifier circuit B9 can also serve as a rectifier circuit in the power supply circuit B3 mounted on the IC card B1. The feedback path B11 is configured by a MOS transistor, a resistor, and the like. Although the filter circuit B10 is typically configured by a low-pass filter since its main purpose is to eliminate a high-frequency component by a carrier, a band-pass filter may be used. The passband frequency of the filter circuit B10 has to be set so that the filter circuit B10 does not completely eliminate the frequency band of data.

The binarizing circuit B12 has the function of comparing an output signal S3 of the operational amplifier A1 with predetermined voltage and, according to the result, outputting a low level "L" or a high level "H" as the information signal SR. In the embodiment, in the case where the output signal S3 of the operational amplifier A1 is higher than the predetermined voltage, the low level "L" is output. In the case where the output signal S3 of the operational amplifier A1 is lower than the predetermined voltage, the high level "H" is output.

The control circuit B13 has the function of outputting the high level "H" for a period of lapse of predetermined time T1 since the change point of the signal level of the information signal SR output from the binarizing circuit B12.

The switch circuit SW1 is on/off controlled by a control signal SC1 which is output from the control circuit B13 and has the function of changing the operation state of a negative feedback circuit formed by the operational amplifier A1 and the feedback path B11. Since the switch circuit SW1 is on when the control signal SC1 is at the low level "L", the feedback path B11 electrically couples the output terminal of the operational amplifier A1 to the inverting input terminal (−), and the negative feedback circuit formed by the operational amplifier A1 and the feedback path B11 enters an active (enable) state. On the contrary, when the control signal SC1 is at the high level "H", the switch circuit SW1 is set to the off state. Therefore, the feedback path B11 electrically decouples the output terminal of the operational amplifier A1 from the inverting input terminal (−), and the negative feedback circuit formed by the operational amplifier A1 and the feedback path B11 enters an inactive (disable) state.

Since the output terminal voltage of the operational amplifier A1 changes in the range from the grounding potential to the power supply voltage, the switch circuit SW1 is typically configured by a CMOS switch formed by a P-channel MOS transistor and an N-channel MOS transistor to which logic signals of opposite polarities are supplied.

<<Operation of Receiver Circuit of First Embodiment>>

FIG. 4 is a diagram showing operation waveforms of units in the receiver circuit B5 provided in the internal circuit B4 of the semiconductor integrated circuit device B2 mounted on the IC card B1 and illustrated in FIG. 3.

In FIG. 4, (A) indicates downlink communication data transmitted from the reader/writer device, (B) indicates voltage generated between the antenna terminals LA and LB, (C) indicates the output signal S1 of the filter circuit B10, (D) shows the information signal SR output from the receiver circuit B5, (E) shows the control signal SC1 generated by the control circuit B13 in response to the information signal SR of the binarizing circuit B12, and (F) illustrates the operation state of the negative feedback circuit formed by the operational amplifier A1 and the feedback path B11.

As shown in FIG. 4, in the lapse period of the predetermined time T1 immediately after each of change points X, Y, ... between data "1" and data "0" of an amplitude modulation transmission carrier signal from the reader/writer device U2, the switch of the switch circuit SW1 is set to the off state by the control signal SC1 of the high level "H" as an output of the control circuit B13. Therefore, in this period, the output terminal of the operational amplifier A1 is electrically decoupled from the inverting input terminal (−), and the negative feedback circuit formed by the operational amplifier A1 and the feedback path B11 enters the inactive state. On the other hand, in the other period, the switch of the switch circuit SW1 is set to the on state by the control signal SC1 of the low level "L" as the output of the control circuit B13, and the output terminal of the operational amplifier A1 is electrically coupled to the inverting input terminal (−) by the feedback path B11, so that the negative feedback circuit formed by the operational amplifier A1 and the feedback path B11 enters an active state.

In the period that the switch of the switch circuit SW1 is set to the on state and the negative feedback circuit is in the active state, amplification gain of the operational amplifier A1 becomes a small value by the negative feedback of the feedback path B11, the input signal S2 of the inverting input terminal (−) of the operational amplifier A1 is accurately amplified, and the output signal S3 which is accurately inverted and amplified is obtained.

On the other hand, in the lapse period of the predetermined time T1 in which the switch of the switch circuit SW1 is set to the off state and the negative feedback circuit is in the inactive state, amplification gain of the operational amplifier A1 becomes a large value by the inactive state of the negative feedback of the feedback path B11, and the operational amplifier A1 amplifies the input signal S2 of the inverting input terminal (−) by extremely large amplification gain. Therefore, in the state of the very high amplification gain, the input signal S2 of the inverting input terminal (−) of the operational amplifier A1 is not accurately amplified, and the output signal S3 which is inverted and amplified becomes a saturation level of the power supply voltage $V_{DD}$ or the grounding potential GND. As a result, it is solved that the return of the amplitude after the overshoot or undershoot is included in the output signal S3 of the operational amplifier A1 in the period. Therefore, an erroneous operation in demodulation by the return of the amplitude after an overshoot or undershoot can be solved.

As shown in FIG. 4, just before a change point X where the amplitude of the transmission carrier signal from the reader/writer device U2 becomes smaller, the switch of the switch circuit SW1 is in the on state, so that the negative feedback circuit formed by the operational amplifier A1 and the feedback circuit B11 is in the active state. Accordingly, the voltage level of the input signal S1 to the inverting input terminal (−) of the operational amplifier A1 is controlled to be extremely close to the reference voltage V1 of the non-inverting input terminal (+). By the negative feedback of the feedback path B11, the amplification gain of the operational amplifier A1 becomes a smaller value, the input signal S2 of the inverting input terminal (−) of the operational amplifier A1 is accurately amplified, and the output signal S3 which is accurately inverted and amplified is obtained.

At the change point X where the amplitude of the transmission carrier signal from the reader/writer device U2 becomes smaller, the voltage between the antenna terminals is rectified and smoothed by the rectifier circuit B9, and a voltage change $V_X$ in the negative direction occurs in the signal S1 from which the unnecessary frequency component is removed by the filter circuit B10.

The voltage change $V_X$ is transmitted to the input signal S2 of the inverting input terminal (−) of the operational amplifier A1 via the capacitor C1, and the voltage change $V_X$ is supplied to the inverting input terminal (−) of the operational amplifier A1. Consequently, the output signal S3 derived by inverting and amplifying the input signal S2 is obtained from the output terminal of the operational amplifier A1, so that the information signal SR output from the binarizing circuit B12 changes to the low level "L".

Since the information signal SR changes to the low level "L" by the above operation, the control signal SC1 output from the control circuit B13 becomes the high level "H" and, until the time T1 elapses, the control signal SC1 is maintained at the high level "H". Accordingly, the switch of the switch circuit SW1 becomes the off state, so that the output terminal of the operational amplifier A1 is electrically decoupled from the inverting input terminal (−) by the feedback path B11, and the negative feedback circuit formed by the operational amplifier A1 and the feedback path B11 enters an inactive state.

Since the transmission modulation signal from the reader/writer device U2 has an undershoot during the period, the output signal S1 of the filter circuit B9 increases only by undershoot voltage $V_U$ and is stabilized at voltage lower than the voltage before the change point X only by a voltage difference $V_D$.

At this time, as described above, the negative feedback circuit formed by the operational amplifier A1 and the feedback path B11 is in the inactive state, and the voltage level at the inverting input terminal (−) of the operational amplifier A1 maintains a state where it is lower than the reference voltage V1 only by the voltage difference $V_D$. During the period, the operational amplifier A1 in the very high amplitude gain state does not accurately amplify the voltage change $V_X$ in the negative direction of the input signal S2 of the inverting input terminal (−), and the output signal S3 becomes the saturation level of the power supply voltage $V_{DD}$. Consequently, no return of the amplitude after the undershoot occurs in the output signal S3 of the operational amplifier A1, so that the information signal SR output from the binarizing circuit B12 is maintained at the stable low level "L".

After that, when the information signal SR output from the binarizing circuit B12 changes to the low level "L" and predetermined time T1 elapses, the control signal SC1 output from the control circuit B13 changes to the low level "L". Consequently, the switch of the switch circuit SW1 is turned on, and the negative feedback circuit formed by the operational amplifier A1 and the feedback path B11 enters an active state. Accordingly, the voltage level of the input signal S1 to the inverting input terminal (−) of the operational amplifier A1 is controlled to a voltage level extremely close to the reference voltage V1. At this time, the low voltage $V_D$ of the input signal S2 of the inverting input terminal (−) of the operational amplifier A1 which was set to the smaller amplification gain by the negative feedback is accurately amplified, and the output signal S3 of the high level which is accurately inverted and amplified is obtained.

As described above, after detection of the amplitude change in the change point X by the downlink communication data, the receiver circuit shown in FIG. 3 completely ignores the amplitude change which occurs in the lapse period of the predetermined time T1 and can stably amplify the signal change in the low voltage $V_D$ generated at a time point after lapse period of the time T1.

At a change point Y where the amplitude of the carrier signal transmitted from the reader/writer device of FIG. 4 becomes smaller, a voltage change $V_Y$ in the positive direction occurs in the signal S1 obtained by rectifying and smoothing the voltage between the antenna terminals by the rectifier circuit B9 and eliminating an unnecessary frequency component by the filter circuit B10.

The voltage change $V_Y$ is transmitted to the input signal S2 of the inverting input terminal (−) of the operational amplifier A1 via the capacitor C1, and the voltage change $V_Y$ is supplied to the inverting input terminal (−) of the operational amplifier A1. Since the output signal S3 obtained by inverting and amplifying the input signal S2 is consequently obtained from the output terminal of the operational amplifier A1, the information signal SR which is output from the binarizing circuit B12 changes to the high level "H".

Since the information signal SR changes to the high level "H" by the above operation, the control signal SC1 output from the control circuit B13 becomes the high level "H" and, until the time T1 elapses, the control signal SC1 is maintained at the high level "H". Accordingly, the switch of the switch circuit SW1 becomes the off state, so that the output terminal of the operational amplifier A1 is electrically decoupled from the inverting input terminal (−) by the feedback path B11, and the negative feedback circuit formed by the operational amplifier A1 and the feedback path B11 enters an inactive state.

Since the transmission modulation signal from the reader/writer device U2 has an overshoot during the period, the output signal 51 of the filter circuit B9 decreases only by overshoot voltage $V_O$ and is stabilized at voltage higher than the voltage before the change point Y only by the voltage difference $V_D$.

At this time, as described above, the negative feedback circuit formed by the operational amplifier A1 and the feedback path B11 is in the inactive state, and the voltage level at the inverting input terminal (−) of the operational amplifier A1 maintains a state where it is higher than the reference voltage V1 only by the voltage difference $V_D$. During the period, the operational amplifier A1 in the very high amplitude gain state does not accurately amplify the voltage change $V_Y$ in the positive direction of the input signal S2 of the inverting input terminal (−), and the output signal S3 becomes the saturation level of the grounding potential GND. Consequently, no return of the amplitude after the overshoot occurs in the output signal S3 of the operational amplifier A1, so that the information signal SR output from the binarizing circuit B12 is maintained at the stable high level "H".

After that, when the information signal SR output from the binarizing circuit B12 changes to the high level "H" and predetermined time T1 elapses, the control signal SC1 output from the control circuit B13 changes to the low level "L". Consequently, the switch of the switch circuit SW1 is turned on, and the negative feedback circuit formed by the operational amplifier A1 and the feedback path B11 enters an active state. Accordingly, the voltage level of the input signal S1 to the inverting input terminal (−) of the operational amplifier A1 is controlled to a voltage level extremely close to the reference voltage V1. At this time, the high voltage $V_D$ of the input signal S2 of the inverting input terminal (−) of the operational amplifier A1 which was set to the smaller amplification gain by the negative feedback is accurately amplified, and the output signal S3 of the low level which is accurately inverted and amplified is obtained.

As described above, after detection of the amplitude change in the change point Y by the downlink communication data, the receiver circuit shown in FIG. 3 completely ignores the amplitude change which occurs in the lapse period of the predetermined time T1 and can stably amplify the signal change in the low voltage $V_D$ generated at a time point after lapse period of the time T1.

By the above operation, the receiver circuit shown in FIG. 3 generates the information signal SR obtained by accurate reception. It can be confirmed also from FIG. 4 that, when the high level "H" of the information signal SR shown in (D) is interpreted as "1" and the low level "L" is interpreted as "0", the information signal SR coincides with downlink communication data transmitted from the reader/writer device illustrated in FIG. 3A.

From the above description, even in the case where a modulation signal which forms the downlink communication data transmitted from the reader/writer device U2 has a large undershoot or overshoot at the time of an amplitude change, the amplitude change by the downlink communication data is accurately detected, and the transmission information signal superimposed on the transmission carrier signal from the reader/writer device U2 can be stably demodulated. Although the undershoot and the overshoot are output from the reader/writer device U2 in the above description, the invention is not limited to the case. A similar effect can be also obtained from an undershoot, overshoot, ringing or the like caused by response speed of the power supply circuit B3 mounted on the IC card B1. Further, although not shown or described, even in the case where there is no undershoot or overshoot, stable demodulation operation can be similarly performed.

In the above description, the control circuit B13 outputs the control signal SC1 which is at the high level "H" only for the lapse period of the predetermined time T1 since the level change in the output signal S3 of the binarizing circuit B12. However, the invention is not limited to the case. The output period T1 of the high level "H" of the control signal SC1 can be changed from the waveform of FIG. 4 between the case where the output signal S3 of the binarizing circuit B12 changes from the high level "H" to the low level "L" and the case where the output signal S3 changes from the low level "L" to the high level "H". Preferably, the time T1 is longer than the overshoot or undershoot occurrence period and, further, it is preferable to generate the time T1 in proportional to the frequency of a carrier wave.

Second Embodiment

<<Configuration of Receiver Circuit of Second Embodiment>>

FIG. 5 is a diagram showing the configuration of the receiver circuit B5 according to a second embodiment of the present invention, which is provided in the internal circuit B4 of the semiconductor integrated circuit device B2 mounted on the IC card B1 illustrated in FIG. 1.

The receiver circuit B5 shown in FIG. 5 includes, in a manner quite similar to the receiver circuit B5 shown in FIG. 3, the rectifier circuit B9, the filter circuit B10, the capacitor C1, the operational amplifier A1, the feedback path B11, the switch circuit SW1, the binarizing circuit B12, and the control circuit B13.

The receiver circuit B5 shown in FIG. 5 is different from the receiver circuit 85 shown in FIG. 3 with respect to the point that the feedback path B11 is configured by p-n junction diodes D1 and D2 which are coupled in parallel in directions opposite to each other. Therefore, when a voltage difference equal to or larger than forward voltage of the diodes D1 and D2 occurs between the inverting input terminal (−) of the operational amplifier A1 and the output terminal of the operational amplifier A1 in a state where the switch circuit SW1 is on, the feedback path B11 realizes the function of a voltage clamp by passing current from the diodes.

<<Operation of Receiver Circuit of Second Embodiment>>

Figure 6:
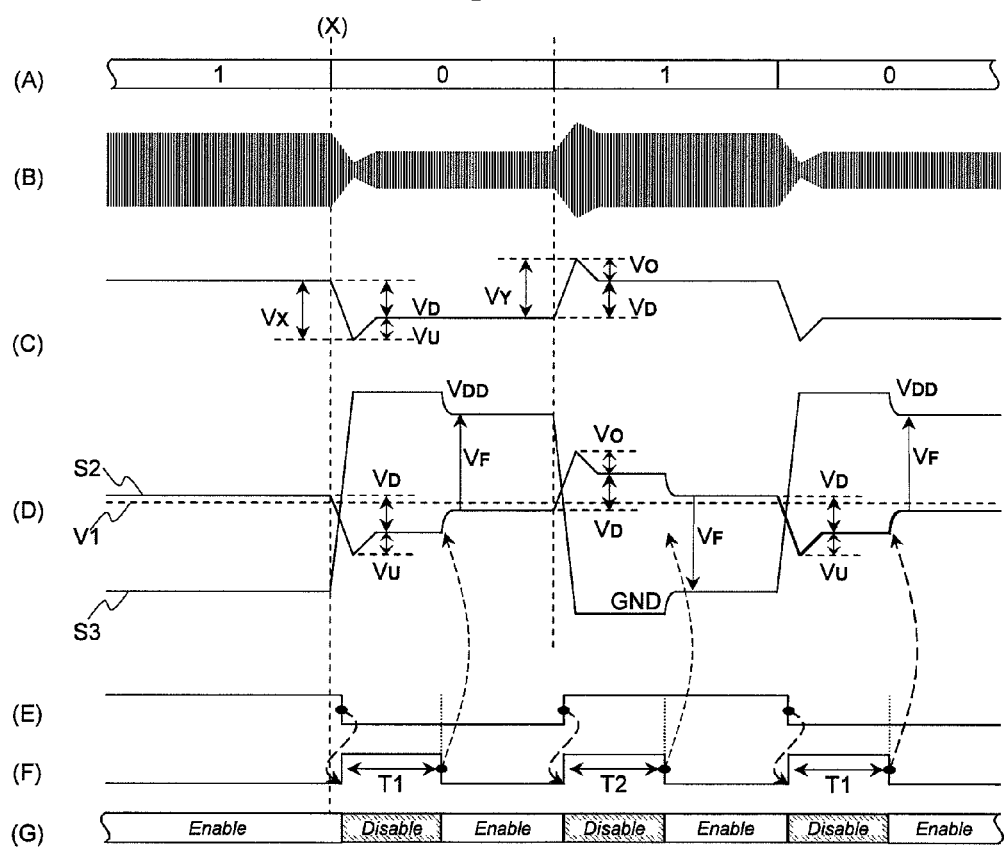
FIG. 6 is a diagram showing operation waveforms of units in the receiver circuit B5 provided in the internal circuit B4 of the semiconductor integrated circuit device B2 mounted on the IC card B1 and illustrated in FIG. 5.

FIG. 6 is a diagram showing operation waveforms of units in the receiver circuit B5 illustrated in FIG. 5, which is provided in the internal circuit B4 of the semiconductor integrated circuit device B2 mounted on the IC card B1.

In FIG. 6, (A) indicates downlink communication data transmitted from the reader/writer device, (B) indicates voltage generated between the antenna terminals LA and LB, (C) indicates the output signal 51 of the filter circuit B10, (D) shows the reference voltage V1 and the input signal S2 and the output signal S3 of the operational amplifier A1, (E) shows the information signal SR output from the receiver circuit B5, (F) shows the control signal SC1 generated according to the information signal SR which is output from the receiver circuit B5, and (G) illustrates the operation state of the negative feedback circuit formed by the operational amplifier A1 and the feedback path B11.

Also in the operation waveforms shown in FIG. 6, in the lapse period of the predetermined time T1 since the voltage change $V_X$ in the negative direction occurs in the output signal S1 of the filter circuit B10 at the change point X where the amplitude of the transmission carrier signal from the reader/writer device U2 becomes smaller, the switch of the switch circuit SW1 is set to the off state, and the negative feedback circuit by the feedback path B11 is set to an inactive state. Therefore, the operational amplifier A1 amplifies the input signal S2 to the inverting input terminal (−) by an extremely large amplification gain. As a result, in the state of the very high amplification gain, the input signal S2 to the inverting input terminal (−) of the operational amplifier A1 is not accurately amplified, and the output signal S3 of the inversion and amplification becomes the saturation level of the power supply voltage $V_{DD}$ as shown in (D) in FIG. 6. Therefore, it is solved that the return of the amplitude after the undershoot is included in the output signal S3 of the operational amplifier A1 in the period. Therefore, an erroneous operation in demodulation caused by the return of the amplitude after an undershoot can be solved.

After lapse of the predetermined time T1, the switch of the switch circuit SW1 is turned on, and the negative feedback circuit formed by the feedback path B11 is set to the active state. At this time, the input signal S2 of the low voltage level and the output signal S3 of the high voltage level are supplied to the cathode and the anode, respectively, of the diode D1 in the feedback path B11. Therefore, the voltage is applied in the forward direction of the diode D1 in the feedback path B11, and the diode D1 is conducted. As a result, the voltage level of the output signal S3 of the operational amplifier A1 is clamped to a level higher than the voltage level of the input signal S2 only by forward voltage $V_F$ of the diode D1. In such a manner, by clamp of the diode D1 in the feedback path B11, the output signal S3 of the operational amplifier A1 can be maintained at a stable voltage level.

Further, in a lapse period of predetermined time T2 since a voltage change $V_Y$ in the positive direction occurs in the output signal S1 of the filter circuit B10 at a change point Y where the amplitude of the carrier signal transmitted from the reader/writer device U2 becomes large, the switch of the switch circuit SW1 is set to the off state, and the negative feedback circuit formed by the feedback path B11 is set to the inactive state. Therefore, the operational amplifier A1 amplifies the input signal S2 of the inverting input terminal (−) by extremely large amplification gain. As a result, in the state of the very high amplification gain, the input signal S2 of the inverting input terminal (−) of the operational amplifier A1 is not accurately amplified, and the output signal S3 which is inverted and amplified becomes a saturation level of the grounding potential GND as shown in (D) in FIG. 6. Therefore, it is solved that the return of the amplitude after the overshoot is included in the output signal S3 of the operational amplifier A1 in the period. Thus, an erroneous operation in demodulation by the return of the amplitude after an overshoot can be solved.

After lapse of the predetermined time T1, the switch of the switch circuit SW1 is turned on, and the negative feedback circuit formed by the feedback path B11 is set to the active state. At this time, the input signal S2 of the high voltage level and the output signal S3 of the low voltage level are supplied to the anode and the cathode, respectively, of the diode D2 in the feedback path B11. Therefore, the voltage is applied in the forward direction of the diode D2 in the feedback path B11, and the diode D2 is conducted. As a result, the voltage level of the output signal S3 of the operational amplifier A1 is clamped to a level lower than the voltage level of the input signal S2 only by the forward voltage $V_F$ of the diode D2. In such a manner, by clamp of the diode D2 in the feedback path B11, the output signal S3 of the operational amplifier A1 can be maintained at a stable voltage level.

Third Embodiment

<<Configuration of Receiver Circuit of Third Embodiment>>

FIG. 7 is a diagram showing the configuration of the receiver circuit B5 according to a third embodiment of the present invention, which is provided in the internal circuit B4 of the semiconductor integrated circuit device B2 mounted on the IC card B1 illustrated in FIG. 1.

The receiver circuit B5 shown in FIG. 7 includes, in a manner quite similar to the receiver circuit B5 shown in FIG. 3, the rectifier circuit B9, the filter circuit B10, the capacitor C1, the operational amplifier A1, the feedback path B11, the switch circuit SW1, the binarizing circuit B12, and the control circuit B13.

The receiver circuit B5 shown in FIG. 7 is different from the receiver circuit B5 shown in FIG. 3 with respect to the point that the feedback path B11 is configured by a diode-coupled P-channel MOS transistor M1 and a diode-coupled N-channel MOS transistor M2, and the switch circuit SW1 is configured by a P-channel MOS transistor M3 and an N-channel MOS transistor M4. Therefore, when a voltage difference equal to or larger than a threshold voltage of the clamp MOS transistors M1 and M2 occurs between the inverting input terminal (−) of the operational amplifier A1 and the output terminal of the operational amplifier A1 in a state where the switch circuit SW1 is on, the feedback path B11 realizes the function of a voltage clamp by passing current from the clamp MOS transistors M1 and M2.

Specifically, the feedback path B11 of the receiver circuit B5 shown in FIG. 7 is configured by the P-channel MOS transistor M1 which is diode-coupled by coupling the gate electrode and the drain electrode and the N-channel MOS transistor M2 which is diode-coupled by coupling the gate electrode and the drain electrode.

In the switch SW1, the drain electrode of the P-channel MOS transistor M3 is coupled to the source electrode of the P-channel MOS transistor M1 in the feedback path B11, and the drain electrode of the N-channel MOS transistor M4 is coupled to the source electrode of the N-channel MOS transistor M2 in the feedback path B11. Further, the output signal S3 of the output terminal of the operational amplifier A1 is supplied to the source electrode of the P-channel MOS transistor M3 and the source electrode of the N-channel MOS transistor M4. Further, control signals SC2 and SC3 generated from the control circuit B13 are supplied to the gate electrode of the P-channel MOS transistor M3 and the gate electrode of the N-channel MOS transistor M4, respectively.

<<Operation of Receiver Circuit of Third Embodiment>>

Figure 8:
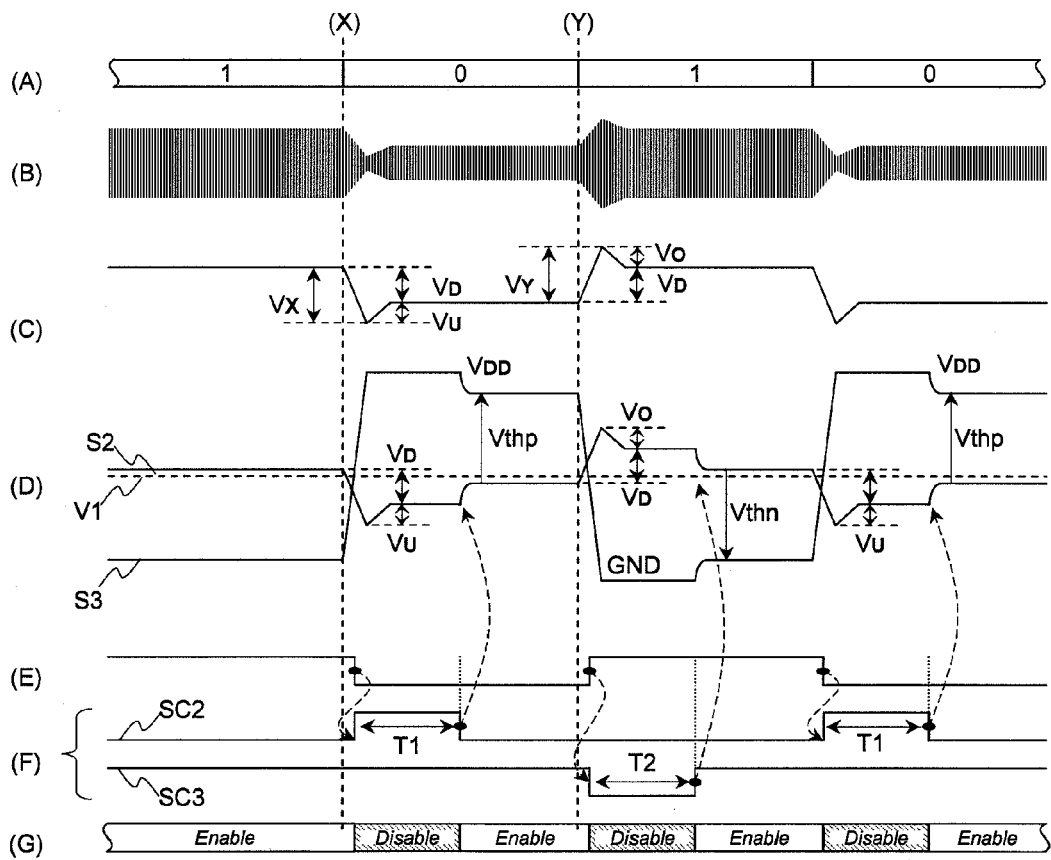
FIG. 8 is a diagram showing operation waveforms of units in the receiver circuit B5 provided in the internal circuit B4 of the semiconductor integrated circuit device B2 mounted on the IC card B1 and illustrated in FIG. 7.

FIG. 8 is a diagram showing operation waveforms of units in the receiver circuit B5 illustrated in FIG. 7, which is provided in the internal circuit B4 of the semiconductor integrated circuit device B2 mounted on the IC card B1.

In FIG. 8, (A) indicates downlink communication data transmitted from the reader/writer device, (B) indicates voltage generated between the antenna terminals LA and LB, (C) indicates the output signal S1 of the filter circuit B10, (D) shows the reference voltage V1 and the input signal S2 and the output signal S3 of the operational amplifier A1, (E) shows the information signal SR output from the receiver circuit B5, (F) shows the control signals SC2 and SC3 generated according to the information signal SR which is output from the receiver circuit B5, and (G) illustrates the operation state of the negative feedback circuit formed by the operational amplifier A1 and the feedback path B11.

Also in the operation waveforms shown in FIG. 8, in the lapse period of the predetermined time T1 since the voltage change $V_X$ in the negative direction occurs in the output signal S1 of the filter circuit B10 at the change point X where the amplitude of the transmission carrier signal from the reader/writer device U2 becomes smaller, the P-channel MOS transistor M3 of the switch circuit SW1 is set to the off state by the control signal SC2 of the high level as one of the control signals, and the negative feedback circuit by the diode-coupled P-channel MOS transistor M1 in the feedback path B11 is set to an inactive state. In this period, the N-channel MOS transistor M4 is set to the on state by the other high-level control signal SC3. A reverse bias voltage is supplied across the terminals of the diode-coupled N-channel MOS transistor M2, and the MOS transistor M2 is set to the off state. Therefore, the operational amplifier A1 amplifies the input signal S2 to the inverting input terminal (−) by an extremely large amplification gain. As a result, in the state of the very high amplification gain, the input signal S2 to the inverting input terminal (−) of the operational amplifier A1 is not accurately amplified, and the output signal S3 of the inversion and amplification becomes the saturation level of the power supply voltage $V_{DD}$ as shown in (D) in FIG. 8. Therefore, it is solved that the return of the amplitude after the undershoot is included in the output signal S3 of the operational amplifier A1 in the period. Therefore, an erroneous operation in demodulation caused by the return of the amplitude after an undershoot can be solved.

After lapse of the predetermined time T1, the P-channel MOS transistor M3 of the switch circuit SW1 is set to the on state by the control signal SC2 as one of low-level signals, and the negative feedback circuit formed by the feedback path B11 is set to the active state. At this time, the input signal S2 of the low voltage level and the output signal S3 of the high voltage level are supplied to the gate-drain electrode and the source electrode, respectively, of the diode-coupled P-channel MOS transistor M1 in the feedback path B11. When the difference voltage between the signals S2 and S3 exceeds a threshold voltage Vthp of the diode-coupled P-channel MOS transistor M1, the MOS transistor M1 is conducted. As a result, the voltage level of the output signal S3 of the operational amplifier A1 is clamped to a level higher than the voltage level of the input signal S2 only by the threshold voltage Vthp of the diode-coupled P-channel MOS transistor M2. In such a manner, by clamp of the diode P-channel MOS transistor M2 in the feedback path B11, the output signal S3 of the operational amplifier A1 can be maintained at a stable voltage level.

Further, in a lapse period of predetermined time T2 since the voltage change $V_Y$ in the positive direction occurs in the output signal S1 of the filter circuit B10 at the change point Y where the amplitude of the carrier signal transmitted from the reader/writer device U2 becomes large, the N-channel MOS transistor M4 of the switch circuit SW1 is set to the off state by the control signal SC3 as the other low-level signal, and the negative feedback circuit formed by the diode-coupled N-channel MOS transistor M2 in the feedback path B11 is set to the inactive state. Therefore, the operational amplifier A1 amplifies the input signal S2 of the inverting input terminal (−) by extremely large amplification gain. As a result, in the state of the very high amplification gain, the input signal S2 of the inverting input terminal (−) of the operational amplifier A1 is not accurately amplified, and the output signal S3 which is inverted and amplified becomes a saturation level of the grounding potential GND as shown in (D) in FIG. 8. Therefore, it is solved that the return of the amplitude after the overshoot is included in the output signal S3 of the operational amplifier A1 in the period. Thus, an erroneous operation in demodulation by the return of the amplitude after an overshoot can be solved.

After lapse of the predetermined time T2, the N-channel MOS transistor M4 of the switch circuit SW1 is turned on by the control signal SC3 as the other high-level control signal, and the negative feedback circuit formed by the feedback path B11 is set to the active state. At this time, the input signal S2 of the high voltage level and the output signal S3 of the low voltage level are supplied to the gate-drain electrode and the source electrode, respectively, of the diode-coupled N-channel MOS transistor M2. When the difference voltage between the signals S2 and S3 exceeds a threshold voltage Vthn of the diode-coupled N-channel MOS transistor M2, the MOS transistor M2 is conducted. As a result, the voltage level of the output signal S3 of the operational amplifier A1 is clamped to a level lower than the voltage level of the input signal S2 only by the threshold voltage Vthn of the diode-coupled N-channel MOS transistor M2. In such a manner, by clamp of the diode-coupled N-channel MOS transistor M2 in the feedback path B11, the output signal S3 of the operational amplifier A1 can be maintained at a stable voltage level.

Fourth Embodiment

<<Configuration of Receiver Circuit of Fourth Embodiment>>

FIG. 9 is a diagram showing the configuration of the receiver circuit B5 according to a fourth embodiment of the present invention, which is provided in the internal circuit B4 of the semiconductor integrated circuit device B2 mounted on the IC card B1 illustrated in FIG. 1.

The receiver circuit B5 shown in FIG. 9 includes, in a manner quite similar to the receiver circuit B5 shown in FIG. 3, the rectifier circuit B9, the filter circuit B10, the capacitor C1, the operational amplifier A1, the feedback path B11, the switch circuit SW1, the binarizing circuit B12, and the control circuit B13.

The receiver circuit B5 shown in FIG. 9 is different from the receiver circuit B5 shown in FIG. 3 with respect to the point that the feedback path B11 is configured by a resistor R1. Therefore, when a voltage difference occurs between the inverting input terminal (−) of the operational amplifier A1 and the output terminal of the operational amplifier A1 in a state where the switch circuit SW1 is on, the resistor R1 of the feedback path B11 realizes the function of causing a voltage drop.

<<Operation of Receiver Circuit of Fourth Embodiment>>

Figure 10:
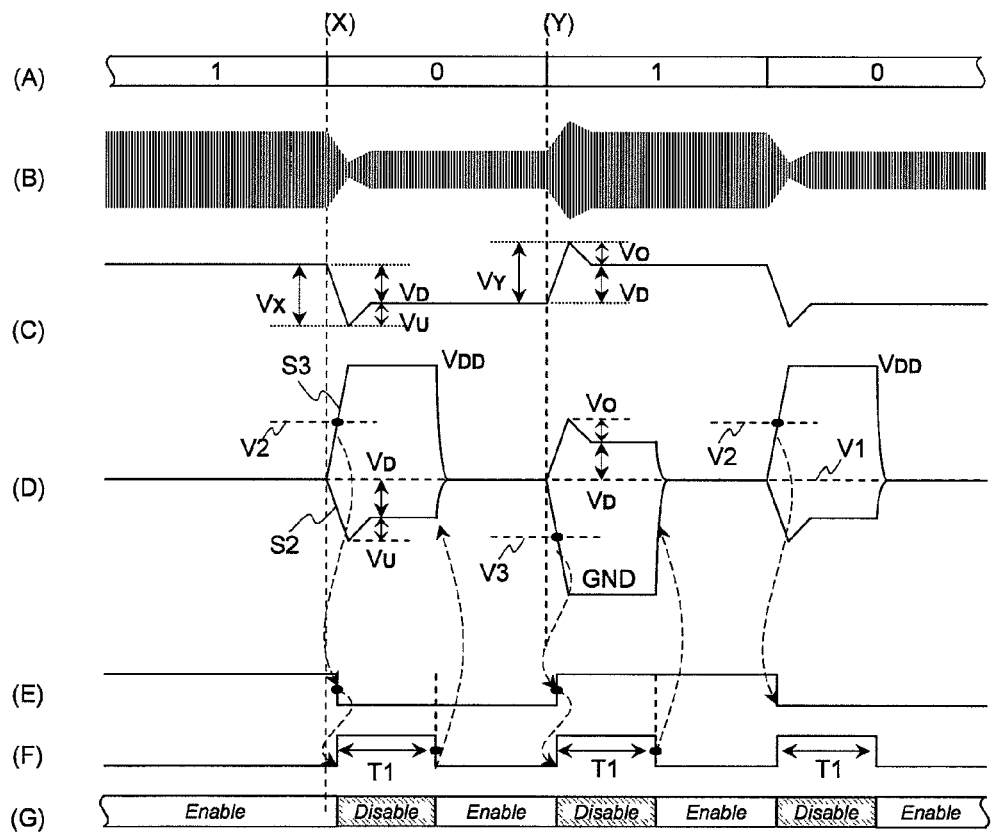
FIG. 10 is a diagram showing operation waveforms of units in the receiver circuit B5 provided in the internal circuit B4 of the semiconductor integrated circuit device B2 mounted on the IC card B1 and illustrated in FIG. 9.

FIG. 10 is a diagram showing operation waveforms of units in the receiver circuit B5 illustrated in FIG. 9, which is provided in the internal circuit B4 of the semiconductor integrated circuit device B2 mounted on the IC card B1.

In FIG. 10, (A) indicates downlink communication data transmitted from the reader/writer device, (B) indicates voltage generated between the antenna terminals LA and LB, (C) indicates the output signal S1 of the filter circuit B10, (D) shows the reference voltage V1 and the input signal S2 and the output signal S3 of the operational amplifier A1, (E) shows the information signal SR output from the receiver circuit B5, (F) shows the control signal SC1 generated according to the information signal SR which is output from the receiver circuit B5, and (G) illustrates the operation state of the negative feedback circuit formed by the operational amplifier A1 and the feedback path B11.

Also in the operation waveforms shown in FIG. 10, in the lapse period of the predetermined time T1 since the voltage change $V_X$ in the negative direction occurs in the output signal S1 of the filter circuit B10 at the change point X where the amplitude of the transmission carrier signal from the reader/writer device U2 becomes smaller, the switch of the switch circuit SW1 is set to the off state, and the negative feedback circuit by the feedback path B11 is set to an inactive state. Therefore, the operational amplifier A1 amplifies the input signal S2 to the inverting input terminal (−) by an extremely large amplification gain. As a result, in the state of the very high amplification gain, the input signal S2 to the inverting input terminal (−) of the operational amplifier A1 is not accurately amplified, and the output signal S3 of the inversion and amplification becomes the saturation level of the power supply voltage $V_{DD}$ as shown in (D) in FIG. 10. As a result, it is solved that the return of the amplitude after the undershoot is included in the output signal S3 of the operational amplifier A1 in the period. Therefore, an erroneous operation in demodulation caused by the return of the amplitude after an undershoot can be solved.

After lapse of the predetermined time T1, the switch of the switch circuit SW1 is set to the on state, and the negative feedback circuit formed by the feedback path B11 is set to the active state. At this time, the input signal S2 of the low voltage level and the output signal S3 of the high voltage level are supplied to both ends of the resistor R1 of the feedback path B11. Therefore, a voltage drop occurs between the terminals of the resistor R1 of the feedback path B11. As a result, the voltage level of the output signal S3 of the operational amplifier A1 is set to a level higher than the voltage level of the input signal S2 only by the voltage drop in the resistor R1. In the example shown in (D) in FIG. 10, the resistance value of the resistor R1 of the feedback path B11 is extremely small, and the voltage level of the input signal S1 of the operational amplifier A1 is almost the same as that of the output signal S3 of the operational amplifier A1. If the resistance value of the resistor R1 of the feedback path B11 is set to be relatively large, the voltage level of the output signal S3 of the operational amplifier A1 is set to be higher than that of the input signal S2 only by the relatively large voltage drop in the resistor R1. In such a manner, by the voltage drop in the resistor R1 of the feedback path B11, the output signal S3 of the operational amplifier A1 can be maintained at a stable voltage level.

Further, in a lapse period of predetermined time T1 since the voltage change $V_Y$ in the positive direction occurs in the output signal S1 of the filter circuit B10 at the change point Y where the amplitude of the carrier signal transmitted from the reader/writer device U2 becomes large, the switch of the switch circuit SW1 is set to the off state, and the negative feedback circuit formed by the feedback path B11 is set to the inactive state. Therefore, the operational amplifier A1 amplifies the input signal S2 of the inverting input terminal (−) by extremely large amplification gain. As a result, in the state of the very high amplification gain, the input signal S2 of the inverting input terminal (−) of the operational amplifier A1 is not accurately amplified, and the output signal S3 which is inverted and amplified becomes a saturation level of the grounding potential GND as shown in (D) in FIG. 10. Therefore, it is solved that the return of the amplitude after the overshoot is included in the output signal S3 of the operational amplifier A1 in the period. Thus, an erroneous operation in demodulation by the return of the amplitude after an overshoot can be solved.

After lapse of the predetermined time T1, the switch of the switch circuit SW1 is set to the on state, and the negative feedback circuit formed by the feedback path B11 is set to the active state. At this time, the input signal S2 of the high voltage level and the output signal S3 of the low voltage level are supplied to the ends of the resistor R1 of the feedback path B11. Therefore, a voltage drop occurs between the ends of the resistor R1 of the feedback path B11. As a result, the voltage level of the output signal S3 of the operational amplifier A1 is set to a level lower than the voltage level of the input signal S2 only by the voltage drop in the resistor R1. In the example shown by (D) in FIG. 10, the resistance value of the resistor R1 of the feedback path B11 is extremely small, and the voltage level of the input signal S2 of the operational amplifier A1 becomes almost the same as that of the output signal S3 of the operational amplifier A1. If the resistance value of the resistor R1 of the feedback path B11 is set to be relatively large, the voltage level of the output signal S3 of the operational amplifier A1 is set to be lower than that of the input signal S2 only by the relatively large voltage drop in the resistor R1. As described above, by the voltage drop in the resistor R1 of the feedback path B11, the output signal S3 of the operational amplifier A1 can be maintained at a stable voltage level.

Fifth Embodiment

<<Configuration of Receiver Circuit of Fifth Embodiment>>

FIG. 11 is a diagram showing the configuration of the receiver circuit B5 according to a fifth embodiment of the present invention, which is provided in the internal circuit B4 of the semiconductor integrated circuit device B2 mounted on the IC card B1 illustrated in FIG. 1.

The receiver circuit B5 shown in FIG. 11 includes, in a manner quite similar to the receiver circuit B5 shown in FIG. 5, the rectifier circuit B9, the filter circuit B10, the capacitor C1, the operational amplifier A1, the feedback path B11, the switch circuit SW1, the binarizing circuit B12, and the control circuit B13.

The receiver circuit B5 shown in FIG. 11 is different from the receiver circuit B5 shown in FIG. 5 with respect to the point that a control signal S4 is supplied to the control circuit B13, and the lapse period of the predetermined time T1 from the change point X and the lapse period of the predetermined time T2 from the change point Y can be variably set by the control signal S4.

The control signal S4 is a signal indicative of communication speed and a communication protocol in communication from the reader/writer device, and the control circuit B13 changes the lapse periods of the predetermined times T1 and T2 according to communication speed and a communication protocol designated by the control signal S4.

<<Operation of Receiver Circuit of Fifth Embodiment>>

By configuring the receiver circuit B5 as illustrated in FIG. 11 as described above, optimum time T1 can be used according to the communication speed and the communication protocol.

For example, in the case where the communication speed is low, by increasing the lapse periods of the predetermined times T1 and T2, time of ignoring an undershoot or overshoot is extended. In the case where the communication speed is high, the lapse periods of the predetermined times T1 and T2 are shortened. In the case of a communication protocol with a small allowable range of the undershoot or overshoot, the lapse periods of the predetermined times T1 and T2 are set to be short. On the other hand, in the case of a communication protocol with a large allowable range of the undershoot or overshoot, the lapse periods of the predetermined times T1 and T2 are set to be long.

Sixth Embodiment

<<Configuration of Receiver Circuit of Sixth Embodiment>>

FIG. 12 is a diagram showing the configuration of the receiver circuit B5 according to a sixth embodiment of the present invention, which is provided in the internal circuit B4 of the semiconductor integrated circuit device B2 mounted on the IC card B1 illustrated in FIG. 1.

The receiver circuit B5 shown in FIG. 12 includes, in a manner quite similar to the receiver circuit B5 shown in FIG. 7, the rectifier circuit B9, the filter circuit B10, the capacitor C1, the operational amplifier A1, the feedback path B11, the switch circuit SW1, the binarizing circuit B12, and the control circuit B13. To the receiver circuit B5 shown in FIG. 12, a determining circuit B14 coupled to the binarizing circuit B12 and the control circuit B13 is added.

Therefore, the receiver circuit B5 shown in FIG. 12 is different from the receiver circuit B5 shown in FIG. 7 with respect to the point that the control signal S4 is supplied from the determining circuit B14 to the control circuit B13, and the lapse period of the predetermined time T1 from the change point X and the lapse period of the predetermined time T2 from the change point Y can be variably set.

The control signal S4 is a signal indicative of communication speed and a communication protocol in communication from the reader/writer device, and the control circuit B13 changes the lapse periods of the predetermined times T1 and T2 according to communication speed and a communication protocol designated by the control signal S4.

<<Operation of Receiver Circuit of Sixth Embodiment>>

FIG. 13 is a diagram showing operation waveforms of units in the receiver circuit B5 illustrated in FIG. 12, which is provided in the internal circuit B4 of the semiconductor integrated circuit device B2 mounted on the IC card B1.

In FIG. 13, (A) indicates voltage generated between the antenna terminals LA and LB, (B) indicates the information signal SR output from the receiver circuit in the case where the receiver circuit B5 normally operates with the voltage generated between the antenna terminals LA and LB, (C) indicates the information signal SR which is output from the receiver circuit B5, (D) indicates the control signals SC2 and SC3 generated according to the information signal SR, and (E) expresses a determination signal S4 generated by the determining circuit B14.

In FIG. 13, (F) to (J) show the operation waveforms of units in the case where downlink communication speed from the reader/writer device is slow. (F) indicates the voltage generated between the antenna terminals LA and LB, (G) indicates the information signal SR output from the receiver circuit in the case where the receiver circuit B5 normally operates with the voltage generated between the antenna terminals LA and LB, (H) indicates the information signal SR which is output from the receiver circuit B5, (I) indicates the control signals SC2 and SC3 generated according to the information signal SR, and (J) expresses the determination signal S4 generated by the determining circuit B14.

Specifically, the determining circuit B14 has the function of determining the speed of communication from the reader/writer device by using the information signal SR output from the binarizing circuit B12, and maintains the determination signal S4 at the high level "H" until completion of determination of the communication speed. When it is determined that the communication speed is high, the determining circuit B14 maintains the determination signal S4 at the high level "H". When it is determined that the communication speed is low, the determining circuit B14 sets the determination signal S4 to the low level "L".

As illustrated in (A) to (E) in FIG. 13, in the case where the downlink communication speed from the reader/writer device is high, while the determination signal S4 is maintained at the high level "H" before and after the determination of the communication speed in the determining circuit B14, no change occurs in the determination signal S4. The receiver circuit B5 shown in FIG. 12 operates quite similar to the receiver circuit B5 shown in FIG. 7.

On the other hand, as illustrated in (F) to (J) in FIG. 13, in the case where the downlink communication speed from the reader/writer device is low, the level of the determination signal S4 changes before and after the determination of the communication speed in the determining circuit B14, so that the operation is different from the above-described one.

To be specific, the reader/writer device starts downlink communication, the amplitude of a carrier signal becomes smaller as shown in (F) in FIG. 13 due to the downlink communication data from the reader/writer device, and the receiver circuit B5 detects the first signal change. By the detection, the information signal SR output from the receiver circuit B5 changes from the high level "H" to the low level "L" as shown in (H) in FIG. 13. At almost the same time, the control signal SC2 becomes the high level "H" as shown in (I) in FIG. 13, so that the P-channel MOS transistor M3 enters the off state. Therefore, the P-channel clamp MOS transistor M1 is electrically separated from the output terminal of the operational amplifier A1, and the negative feedback circuit formed by the operational amplifier A1 and the P-channel MOS transistor M1 enters an inactive state. At this time, although the N-channel MOS transistor M4 is set to the on state by the control signal SC3 of the high level "H", the N-channel clamp MOS transistor M2 is in the off state from the potential relation between the input signal S2 of the inverting input terminal (−) of the operational amplifier A1 and the output signal S3 of the output terminal, so that the negative feedback circuit of the clamp MOS transistor M2 is in the inactive state.

After that, until completion of the lapse of the predetermined time T1, the negative feedback circuit maintains the inactive state. Until completion of determination of the communication speed by the determining circuit B14, the determination signal S4 is at the high level "H" as shown in (J) in FIG. 13. Therefore, since the predetermined time T1 is set to shorter time T3 by the control circuit B13, before an input signal change caused by an undershoot ends, the negative feedback circuit formed by the operational amplifier A1 and the P-channel MOS transistor M1 enters the active state. As a result, the undershoot cannot be completely ignored, a return signal UR of the undershoot shown in (F) in FIG. 13 is detected, and the information signal SR output from the receiver circuit B5 changes to the high level "H" as shown in (H) in FIG. 13.

After that, the amplitude of a carrier signal of downlink communication data from the reader/writer device increases, but the receiver circuit B5 has shifted to a state where it cannot capture the increase in the amplitude. In such a manner, the receiver circuit B5 cannot detect an amplitude increase signal change in the downlink communication data, and the information signal SR from the receiver circuit B5 maintains the high level "H" as shown in (J) in FIG. 13.

However, the carrier signal which is amplitude modulated by downlink communication data from the reader/writer device has a large overshoot, so that the receiver circuit B5 detects a return signal OR of the overshoot shown in (F) in FIG. 13, and the information signal SR output from the receiver circuit changes to the low level "L" as shown in (H) in FIG. 13.

The above operation is repeated. In the beginning of determination of the communication speed by the determining circuit B14, as shown in (H) in FIG. 13, the information signal SR different from that in the case where the receiver circuit B5 operates normally is generated. Specifically, in the beginning of determination of the communication speed, an erroneous information signal SR having a cycle largely different from that in the case of normal operation is generated. However, after that, the cycle TC of the information signal SR comes to correspond to that of the downlink communication data. From the cycle TC, the determining circuit B14 can determine the communication speed of the downlink communication. In a more preferred embodiment, the determining circuit B14 which observes the cycle TC a plurality of times and determines the communication speed is employed.

When the determining circuit B14 determines that the communication speed is slow by using the cycle TC of the information signal SR as described above, the determining circuit B14 changes the determination signal S4 to the low level "L" to transmit the fact that the communication speed is slow to the control circuit B13. Therefore, the control circuit B13 changes the predetermined time T1 to a long period T4, and generates the control signals SC2 and SC3 having the predetermined time T1 of the long period T4.

In a more preferred embodiment, at the same time with a change in the duration of the time T1, the state of the signal processor B7 (refer to FIG. 1) which receives the information signal SR output from the receiver circuit B5 and operates is reset. In FIG. 13, time TR is necessary for the resetting. By the resetting, the internal state of the signal processor B7 (refer to FIG. 1) is reset to the initial state. After that, the receiver circuit B5 starts receiving operation in which the undershoot and overshoot are ignored at the time T1 which is set to the long period T4, and can perform receiving operation in which stable amplitude demodulation is executed.

Although it has been described above that the undershoot and the overshoot are output from the reader/writer device, the invention is not limited to the case. Similar effects can be obtained with respect to, for example, the undershoot, overshoot, or ringing caused by response speed in a power supply circuit mounted on an IC card. Further, although not shown, also in the case where there is no undershoot or overshoot, stable demodulation operation can be similarly performed.

Although the invention achieved by the inventors herein has been described concretely on the basis of the embodiments, obviously, the invention is not limited to the foregoing embodiments but can be variously changed without departing from the gist.

For example, in the receiver circuit B5 shown in FIG. 11, the feedback path B11 can be replaced with a resistor in a manner similar to the case of FIG. 9. Further, the operational amplifier A1 having the non-inverting input terminal (+) to which the reference voltage V1 is supplied may be replaced with a CMOS inverter circuit, and a logic threshold voltage of the CMOS inverter circuit may be used as the reference voltage.

In the contactless IC card of FIG. 1, the power supply circuit B3, the receiver circuit B5, the transmitter circuit B6, the controller circuit B7, and the memory B8 can be also configured by a plurality of semiconductor integrated circuit devices (multi-chip).

INDUSTRIAL APPLICABILITY

The present invention can be widely used for, for example, a semiconductor integrated circuit device and a contactless IC card to which a data signal having a large undershoot or overshoot is supplied from the outside.

EXPLANATION OF REFERENCE NUMERALS

A1 . . . operational amplifier
B1 . . . IC card
B2 . . . semiconductor integrated circuit device
B3 . . . power supply circuit
B4 . . . internal circuit
B5 . . . receiver circuit
B6 . . . transmitter circuit
B7 . . . signal processor
B8 . . . memory
B9 . . . rectifier circuit
B10 . . . filter circuit
B11 . . . feedback path
B12 . . . binarizing circuit
B13 . . . control circuit
B14 . . . determining circuit
L1 . . . antenna
C0, C1 . . . capacitors
D1, D2 . . . diodes
M1, M3 . . . P-channel MOS transistors
M2, M4 . . . N-channel MOS transistors
SR, ST . . . information signals
SC1 to SC3 . . . control signals
S1 . . . input signal
S2 . . . input signal
S3 . . . output signal
S4 . . . determination signal
SW1 . . . switch circuit
T1 to T4 . . . time
TR . . . reset time
L1 . . . antenna
LA, LB . . . antenna terminals
U1 . . . printed wiring board
U2 . . . reader/writer device
U3 . . . coil
U4 . . . IC chip
$V_{DD}$ . . . power supply voltage
GND . . . grounding potential
V1 to V3 . . . reference voltages
$V_X, V_Y$ . . . voltage changes
$V_U$ . . . undershoot voltage
$V_O$ . . . overshoot voltage
$V_D$ . . . voltage difference

What is claimed is:

1. A semiconductor integrated circuit device comprising:
an antenna terminal coupled to an antenna;
a power supply circuit that generates power supply voltage from an alternating-current (AC) signal supplied from the antenna to the antenna terminal; and
a receiver circuit that demodulates an information signal which is superimposed on the AC signal,
wherein the receiver circuit comprises a rectifier circuit, a filter circuit, a capacitor, an amplifier, a feedback path, a switch circuit, a binarizing circuit, and a control circuit,
wherein the rectifier circuit rectifies the AC signal supplied to the antenna terminal to smooth the AC signal,
wherein the filter circuit is configured for an output signal of the rectifier circuit to be supplied to an input terminal of the filter circuit which reduces a high frequency component,
wherein the amplifier is configured for an output signal of the filter circuit to be supplied to an inverting input terminal of the amplifier via the capacitor,
wherein the amplifier has a function of inverting and amplifying an input signal supplied to the inverting input terminal with respect to a first reference voltage,
wherein the inverting input terminal is configured for an output signal of the amplifier to be transmitted to the inverting input terminal via the feedback path and the switch circuit,
wherein the switch circuit is configured to be controlled by an output signal of the control circuit,
wherein the binarizing circuit binarizes the output signal of the amplifier, and
wherein, in a lapse period of predetermined time since a level change in an output signal of the binarizing circuit, the switch circuit is controlled to an off state by the output signal of the control circuit.

2. The semiconductor integrated circuit device according to claim 1,
wherein, when the switch circuit is controlled to the off state in the lapse period of the predetermined time, the feedback path is electrically separated from at least any of the inverting input terminal of the amplifier and an output terminal for generating the output signal.

3. The semiconductor integrated circuit device according to claim 2,
wherein the feedback path comprises two diode elements which are coupled in opposite directions.

4. The semiconductor integrated circuit device according to claim 3,
wherein the diode element of the feedback path comprises a diode of p-n junction.

5. The semiconductor integrated circuit device according to claim 3, wherein the diode element of the feedback path comprises a P-channel MOS transistor and an N-channel MOS transistor.

6. The semiconductor integrated circuit device according to claim 2, further comprising:
a voltage drop element that generates a voltage drop between the inverting input terminal of the amplifier and the output terminal for generating the output signal.

7. The semiconductor integrated circuit device according to claim 4,
wherein the voltage drop element of the feedback path comprises a resistor.

8. The semiconductor integrated circuit device according to claim 2,
wherein the control circuit is configured for a control signal to be supplied to the control circuit, and the lapse period of the predetermined time is variably set by the control signal.

9. The semiconductor integrated circuit device according to claim 2,
wherein the receiver circuit further comprises a determining circuit,
wherein the determining circuit determines communication speed of the information signal superimposed on the AC signal from the output signal of the binarizing circuit,
wherein the control signal as a result of determination of the determining circuit is supplied from the determining circuit to the control circuit, and in response to the control signal, the lapse period of the predetermined time is variably set.

10. The semiconductor integrated circuit device according to claim 1,
wherein the amplifier is an operational amplifier, and the first reference voltage is supplied to a non-inverting input terminal of the operational amplifier.

11. An IC card mounted with a semiconductor integrated circuit device and an antenna over a main surface of a substrate, the antenna being formed by a wire,
wherein the semiconductor integrated circuit device comprises:
an antenna terminal coupled to an antenna;
a power supply circuit that generates power supply voltage from an alternating-current (AC) signal supplied from the antenna to the antenna terminal; and
a receiver circuit that demodulates an information signal which is superimposed on the AC signal,
wherein the receiver circuit comprises a rectifier circuit, a filter circuit, a capacitor, an amplifier, a feedback path, a switch circuit, a binarizing circuit, and a control circuit,
wherein the rectifier circuit rectifies the AC signal supplied to the antenna terminal to smooth the AC signal,
wherein the filter circuit is configured for an output signal of the rectifier circuit to be supplied to an input terminal of the filter circuit which reduces a high frequency component,
wherein the amplifier is configured for an output signal of the filter circuit to be supplied to an inverting input terminal of the amplifier via the capacitor,
wherein the amplifier has a function of inverting and amplifying an input signal supplied to the inverting input terminal with respect to a first reference voltage,
wherein the inverting input terminal is configured for an output signal of the amplifier to be transmitted to the inverting input terminal via the feedback path and the switch circuit,
wherein the switch circuit is configured to be controlled by an output signal of the control circuit,
wherein the binarizing circuit binarizes the output signal of the amplifier, and
wherein in a lapse period of predetermined time since a change in level of an output signal of the binarizing circuit, the switch circuit is controlled to an off state by the output signal of the control circuit.

12. The IC card according to claim 11,
wherein, when the switch circuit is controlled to the off state in the lapse period of the predetermined time, the feedback path is electrically separated from at least any of the inverting input terminal of the amplifier and an output terminal for generating the output signal.

13. The IC card according to claim 12,
wherein the feedback path comprises two diode elements which are coupled in opposite directions.

14. The IC card according to claim 13,
wherein the diode element of the feedback path comprises a diode of p-n junction.

15. The IC card according to claim 13,
wherein the diode element of the feedback path comprises a P-channel MOS transistor and an N-channel MOS transistor.

16. The IC card according to claim 12, further comprising:
a voltage drop element that generates a voltage drop between the inverting input terminal of the amplifier and the output terminal for generating the output signal.

17. The IC card according to claim 16,
wherein the voltage drop element of the feedback path comprises a resistor.

18. The IC card according to claim 12,
wherein the control circuit is configured for a control signal to be supplied to the control circuit, and the lapse period of the predetermined time is variably set by the control signal.

19. The IC card according to claim 12,
wherein the receiver circuit further comprises a determining circuit,
wherein the determining circuit determines communication speed of the information signal superimposed on the AC signal from the output signal of the binarizing circuit,
wherein the control signal as a result of determination of the determining circuit is supplied from the determining circuit to the control circuit, and in response to the control signal, the lapse period of the predetermined time is variably set.

20. The IC card according to claim 11,
wherein the amplifier is an operational amplifier, and the first reference voltage is supplied to a non-inverting input terminal of the operational amplifier.

* * * * *